United States Patent [19]

Yamamoto et al.

[11] Patent Number: 5,734,758
[45] Date of Patent: Mar. 31, 1998

[54] IMAGE PROCESSING APPARATUS

[75] Inventors: Koji Yamamoto, Toyokawa; Yoshiki Matsui; Hirokazu Matsuo, both of Toyohashi, all of Japan

[73] Assignee: Minolta Co., Ltd., Osaka, Japan

[21] Appl. No.: 611,371

[22] Filed: Mar. 5, 1996

[30] Foreign Application Priority Data

Mar. 6, 1995 [JP] Japan ............................ 7-045945

[51] Int. Cl.$^6$ .............................. H04N 1/40; H04N 1/04
[52] U.S. Cl. .................. 382/274; 358/461; 358/448; 358/505; 358/474; 358/462
[58] Field of Search ................... 358/461, 406, 358/504, 497, 498, 448, 449, 486, 474, 468, 471, 505, 537, 494, 482, 483, 513, 462; 382/274, 162, 276, 286, 291; 399/369, 370, 376, 379

[56] References Cited

U.S. PATENT DOCUMENTS

| | | | |
|---|---|---|---|
| 4,870,501 | 9/1989 | Yoshida | 358/447 |
| 5,101,284 | 3/1992 | Tanabe | 358/461 |
| 5,107,344 | 4/1992 | Nosaki et al. | 358/401 |
| 5,267,055 | 11/1993 | Sakamoto et al. | 382/274 |
| 5,296,939 | 3/1994 | Suzuki | 358/453 |
| 5,313,312 | 5/1994 | Yamada | 358/505 |
| 5,583,667 | 12/1996 | Yamada | 358/529 |

FOREIGN PATENT DOCUMENTS

| | | |
|---|---|---|
| 411918A2 | 2/1991 | European Pat. Off. . |
| 3-62776 | 3/1991 | Japan . |

*Primary Examiner*—Edward L. Coles, Sr.
*Assistant Examiner*—Kimberly A. Williams
*Attorney, Agent, or Firm*—Sidley & Austin

[57] ABSTRACT

An image of the original document is read rapidly to effect quick production of the first copy even when the function of the shading correction and the function of the color/monochrome judgment operate. A waiting position P2 of a first slider 211 is located on the opposite side from a scan starting position P3 in reference to a reading area for the original document, and a location of a shading correction plate 206 is interposed between the reading area for the original document and the waiting position P2 of the first slider 211. While the first slider 211 is in the process of returning from the waiting position P2 to the scan starting position P3 for the preparation of reading the image of the original, a shading correction and a color/monochrome judgment are carried out for preventing the first slider 211 from having extra motion.

15 Claims, 15 Drawing Sheets

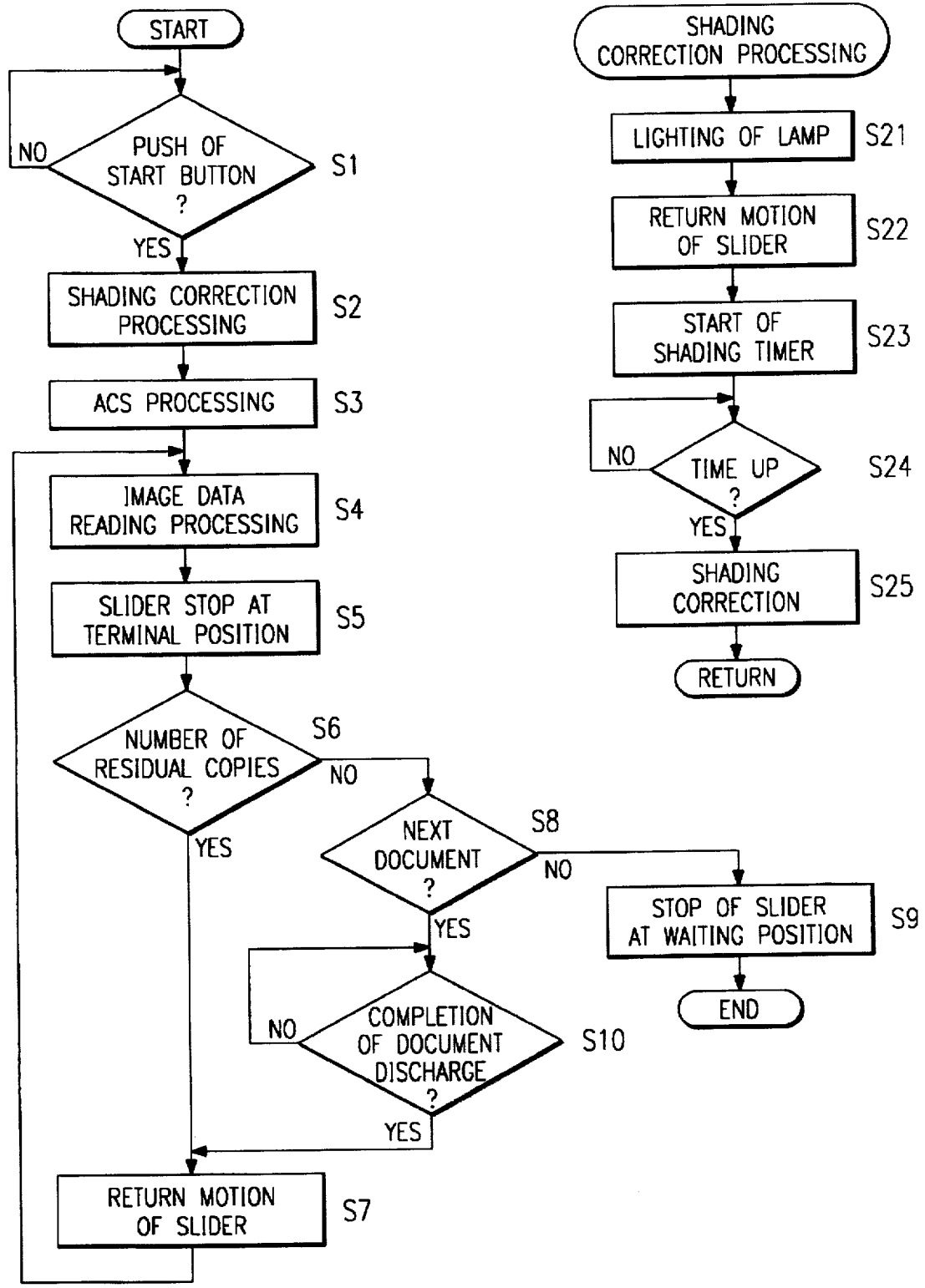

IMAGE PROCESSING APPARATUS

BACKGROUND OF THE INVENTION

1. Field of the Invention

This invention relates to an image processing apparatus and more particularly relates to an image processing apparatus which is endowed with the function of a shading correction for correcting the dispersion of output level among the component picture elements produced by a photoelectric conversion device and the function of sorting for identifying the kind of an original document on a document stand made of glass by discriminating between a color original document and a monochrome original document.

2. Description of the Prior Art

Generally, the copying device comprises an image scanner unit for reading image data out of an original document and for conducting a digital signal processing of the image data and a printer unit for forming an image corresponding to the image data and emitting the formed image as an output. In the image scanner part, a slider, provided with an illuminating lamp or mirror, is freely movably disposed. With the aid of the motion imparted to this slider, the photoelectric conversion device (CCD) reads out the image of an original document placed on the glass top of a document stand. The printer unit prints on a recording paper an image corresponding to the image data on the original document as by the electrophotographic process, for example.

Such means of reading image data out of an original document with the aid of a CCD as the image scanner unit incurs a lack of uniformity of output level (lack of uniformity of shading) among some thousands of picture elements arranged in lines by reason of the dispersion of sensitivity in the picture elements and the dispersion of luminous energy in such optical systems as illuminating lamps. In order to preclude the lack of uniformity of shading, the practice of reading a standard white plate prior to reading the image data of the original document and then processing the white image data electrically for adjusting all the white image data to an identical output level (correction of shading) is in vogue. The standard white plate mentioned above is otherwise called a shading correction plate.

On the basis of the direction in which the slide is moved during the reading of the image data of a subject copy, generally the shading correction plate is disposed on the upstream side of the standard reading position and the slider is kept waiting on the further upstream side of the shading correction plate. In other words, the position at which the slider is kept waiting and the position at which the shading correction plate is disposed both occur on the side opposite to the terminal position of the glass top of the document stand along the direction of secondary scanning on which the standard reading position is set. When the operator presses a start button for outputting a signal to start a copying operation, the slider begins to advance from the waiting position, and roads the shading correction plate for correction of the shading. When the slider subsequently reaches the standard reading position, it initiates the operation of reading the image data of the subject copy.

Among various kinds of color copying devices is counted a kind which is endowed with the function of an automatic color selection (ACS) unit capable of automatically identifying an original document, placed on the glass top of a document stand, by discriminating between a color original document and a monochrome original document. The color copying device provided with the ACS unit, in response to the outcome of the discrimination, proceeds to read image data for the formation of an image out of the original document and to initiate a printing motion. It makes a black monochrome copy when it identifies the original document as being monochrome copy and makes a copy using the four colors, yellow, magenta, cyan, and black, when it identifies the original document as being colored.

The conventional color copying device of the type provided with the ACS unit effects correction of shading and then carries out one round of scanning (pre-scan) by forward motion of the slider from the waiting position to the terminal position for reading and proceeds to discriminate between a color original document and a monochrome original document. Subsequently, the slider returns from the terminal position for reading to the waiting position in preparation for reading the image data of the subject. It carries out the next round of scanning (regular scan) on the basis of the outcome of the discrimination attained by the ACS to implement the reading of the image data of the original document for the formation of an image.

Among the type of conventional color copying devices which are provided with the ACS unit is also counted the type disclosed in JP-A-03-64,269. In this color copying device, the position at which the slider is kept waiting and the position at which the shading correction plate is disposed likewise occur on the side opposite to the terminal position of the glass top of the document stand along the direction of secondary scanning on which the standard reading position is set. In this copying device, when the signal for starting a copying operation is outputted, the slider begins to advance from the waiting position to the terminal position for reading, effects correction of shading, detects the position at which the original document is placed by dint of the first round of scanning carried out during the advance of the slider, and sets the ACS unit operating by dint of the second round of scanning carried out during the return of the slider from the terminal position for reading to the waiting position. Then, on the basis of the outcome of the discrimination effected by the ACS unit, the slider carries out the third round of scanning to effect the reading of the image data of the original document for the formation of an image.

The color copying device of the type having the position at which the slider is kept waiting and the position at which the shading correction plate is disposed occur on the same side as the standard reading position and having the ACS unit operated by the scanning preceding the regular scanning for the formation of an image, however, requires the slider to be advanced by the scanning to be performed for the operation of the ACS unit subsequently to the correction of shading, returned to the waiting position thereof, and reciprocated by the scanning to be performed for the formation of an image. Since this color copying device is required to reciprocate the slider solely for the purpose of preparation for the reading of image data of an original document as described above, it is at a disadvantage in inevitably interposing much time between the time that the start button is pressed and the time that the first copy is completed and consequently retarding the formation of the so-called first copy.

The color copying device disclosed in the (unexamined) patent publication (JP-A-03-64,269) mentioned above likewise incurs the problem of retarded production of the first copy because the position at which the slider is kept waiting and the position at which the shading correction plate is disposed occur on the same side as the standard reading position and one reciprocation of the slider is utilized for the detection of the position of the original document and the operation of the ACS unit.

Incidentally, the copying devices of recent manufacture are furnished, for the sake of facilitating the work of copying, with an automatic document feeder (ADF) capable of automatically feeding a given original document onto the document stand and also automatically discharging the original document therefrom after the reading is completed. Even the color copying device which is provided with this ADF unit as well as the ACS unit mentioned above is confronted with a demand for quickly producing the fist copy even when the correction of shading and the discrimination between a color original document and a monochrome original document are both carried out, augmenting the manipulative convenience on the operation, and permitting miniaturization of the device itself.

Further for the purpose of enabling image data of an original document to be read out accurately and consequently ensuring formation of an image with high quality, it is necessary that a shading correction plate be read out under the same conditions as the image data of the original document are actually read out.

SUMMARY OF THE INVENTION

The first object of this invention is to provide an image processing apparatus which is capable of quickly reading image data out of an original document and quickly producing the first copy even when the function of a shading correction for correcting the dispersion of output level among the component picture elements produced by a photoelectric conversion device and the function of sorting for identifying the kind of an original document on a document stand, for example, by discriminating between a color original document and a monochrome original document, are fulfilled.

The second object of this invention is to provide an image processing apparatus which is further provided with an ADF unit and is capable of quickly producing the first copy, augmenting the manipulative convenience for the operator, and permitting miniaturization of the device itself even when the function of shading correction and the function of discrimination of the kind of an original document are fulfilled.

The third object of this invention is to provide an image processing apparatus which is capable of allowing accurate shading correction and consequently permitting formation of an image of high quality.

To accomplish the first object mentioned above, the present invention provides an image processing apparatus which comprises an image reader for reading an image with a photoelectric conversion device, a slider mechanism adapted to scan image data of an original document and form an image on the photoelectric conversion device and provided with a waiting position on the opposite side from a position for starting a scan relative to a document stand, a shading correction plate interposed between the document stand and the waiting position of the slider mechanism, a shading corrector for correcting the output of the photoelectric conversion device on the basis of the data resulting from reading the shading correction plate, document distinct processor for discerning the kind of document on the document stand, a pre-process controller for returning the slider mechanism from the waiting position to the position for starting a scan and actuating the shading corrector and the document distinct processor while the return is still in process, and an image read controller for advancing the slider mechanism from the position for starting a scan to the waiting position and effecting an operating of reading the image of the original document on the basis of the outcome of the discrimination attained by the document distinct processor.

This image processing apparatus is enabled to implement the correction of shading and the discrimination of the kind of original document while the slider mechanism is in the process of returning from the waiting position to the position for starting a scan for the sake of preparing for the reading of image data of the original document because the waiting position of the slider mechanism falls on the opposite side from the position for starting a scan relative to the range of image reading and the position at which the shading correction plate is disposed intervenes between the range of image reading and the waiting position of the slider mechanism. Even when this apparatus fulfills the function of effecting correction of shading and the function of performing discrimination of the kind of an original document, it makes early start of the reading of image data of the original document, allows quick-reading of the image data, and permits quick formation of the first copy because the slider mechanism has no extra motion.

The identification of the kind of original document embraces the action of discriminating a given original document between a color original document and a monochrome original document.

The image processing apparatus is preferably provided with a document size detector for detecting the size of the document placed on the document stand.

To accomplish the second object mentioned above, the present invention provides an image processing apparatus which further comprises an automatic document feeder for automatically feeding the original document onto the document stand and automatically discharging the original document after the reading of the document is completed, and a positioning member disposed in the terminal part of the document stand on the opposite side from the terminal part in which the shading correction plate is disposed and adapted to position the original document to be fed by the automatic document feeder and which causes the discharge of the document by the automatic document feeder to be effected from the side on which the positioning member is disposed.

Even when this image processing apparatus fulfills the function of the correction of shading and the function of performing discrimination of the kind of original document, it is enabled to effect quick production of the first copy because the slider mechanism has no extra motion. Further, since the feeding of the document by the document feeding means is effected from the side opposite to the position for starting a scan relative to the range of image reading, the order in which the documents are placed on the glass top of the document stand is identical with that of the page numbers of the documents and the order in which the copies of images are formed is also identical therewith even when the apparatus adopts the mode of feeding tow documents simultaneously by the document feeding means and reading image data of the two documents parallel or even when the operator does not commit an error of setting documents upside down in the document feeding means. Thus, the operation of the apparatus from the operator's point of view produces no feeling of inconvenience but proves ideal. Since the position at which the shading correction plate is disposed occurs between the range of image reading and the waiting position of the slider means, the length to be traveled by the slider from the position for starting a scan to the position at which the actual reading is started at the leading end of the document is shorter than when the shading correction plate is disposed on the scan starting position side of the range of image reading. This fact indicates that the image processing apparatus enjoys the merit of miniaturization.

Preferably, the positioning member is retractably constructed so as to avoid interfering with the discharge of the document.

To accomplish the third object mentioned above, the present invention provides an image processing apparatus which has the document stand made of glass and has the shading correction plate disposed on the glass top of the document stand.

This image processing apparatus enables the shading correction plate to be disposed flush with the original document and to be read through the glass shell of the document stand and, therefore, permits the shading correction plate to be read out under the same conditions as when the original document is read out. As a result, this apparatus is capable of accurately effecting the correction of shading and consequently ensuring the formation of an image with high quality.

BRIEF DESCRIPTION OF THE DRAWINGS

FIG. 10 is a main flow chart showing the operation of the image scanner unit in a series of copying operations, FIG. 11 is a flow chart of the routing for processing the shading correction of FIG. 10.

DETAILED DESCRIPTION OF THE INVENTION

Now, the first embodiment of this invention will be described below with reference to the drawings.
Whole construction First, the whole construction of a color image processing apparatus will be described.

Figure 1:
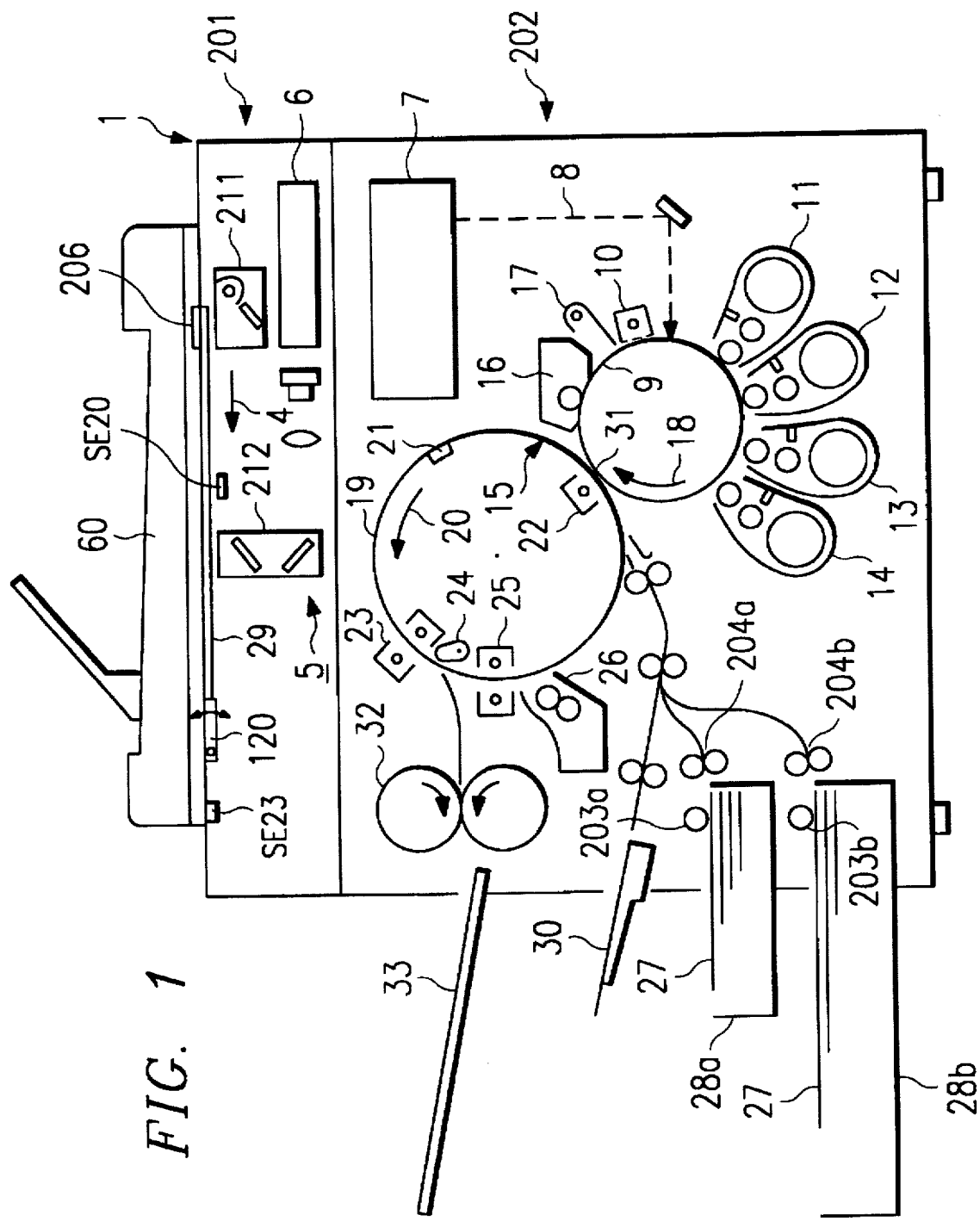
FIG. 1 is a diagram showing the whole construction of one example of the color image processing apparatus of this invention.

The color image processing apparatus of the present embodiment is a color copying device 1 for forming a color image by the electrophotographic process. As shown in FIG. 1, it comprises an image scanner unit 201 for reading an image out of an original document and conducting a digital signal processing thereto and a printer unit 202 for forming an image corresponding to the image read out of the original document and outputting the formed image. A document stand 29 made of a transparent plate glass is attached to the upper side of the image scanner unit 201 and an automatic document feeder (ADF) 60 disposed on the upper side of the document stand 29 is rotatably attached thereto also. An original document is placed in such a manner on the document stand 29 that the surface thereof bearing image document to be copied may be directed downward and it is covered with the ADF 60. Under the document stand 29, a scanning optical system 5 adapted to move in the direction of an arrow mark 4 along the under surface of the document stand 29 and read the image document of the original document placed on the document stand 29. The image of the original document thus read by the scanning optical system 5 is resolved into four-value (yellow, magenta, cyan, and black) image data and stored in an image storage unit 6. The image data thus stored in the image storage unit 6 are transmitted in the order of yellow, magenta, cyan, and black to a laser exposure device 7 of the printer unit 202 and, in response to the image data, laser beam 8 corresponding to the components of the image data are radiated on an electrostatic image carrier, namely a photosensitive member 9.

The photosensitive member 9 is formed of a drum which is provided on the periphery thereof with a photosensitive layer. Around this photosensitive member 9 are disposed a charging device 10, developing devices 11, 12, 13, and 14, a transfer device 15, a cleaning device 16, and a charge releasing device 17. When the photosensitve member 9 is rotated in the direction of an arrow mark 18, the photosensitive layer on the periphery thereof is uniformly charged by the charging device 10. As the laser beam 8 is radiated on the charged area of this photosensitive layer, electrostatic latent images corresponding to the image data of yellow, magenta, cyan, and black are sequentially formed in the order mentioned. These electrostatic latent images are developed into visible images by the developing devices 11, 12, 13, and 14 provided respectively with yellow, magenta, cyan, and black toners and the visible images are sequentially transferred in a superimposed pattern by the transfer device 15 onto a transfer sheet (for example, blank sheet of paper). The parts of the toners which have escaped being transferred onto the transfer sheet are recovered by the cleaning device 16. The charge remaining on the photosensitive member 9 is eliminated by the charge releasing device 17 so as to prepare the photosensitive member 9 for the next round of development.

The transfer device 15 is provided with a transfer drum 19 which rotates in the direction of an arrow mark 20. The transfer drum 19 is provided with a chucking device 21 for retaining on the peripheral part thereof the leading end part of the transfer sheet. The transfer drum 19 is provided in the inner empty space thereof with a transfer charger 22 opposed to the photosensitive member 9. In the proximity of the transfer drum 19, a first charge releasing device 23, a sheet separating device 24, a second charge releasing device 25, and a cleaning device 16 are disposed sequentially in the order mentioned along the direction of the rotation of the transfer drum 19 on the downstream side of the transfer charger 22.

A transfer sheet 27 is fed from either of paper feeding parts 28a or 28b or from a manual feed tray 30 and then retained on the periphery of the transfer drum 19 by the chucking device 21. It is forwarded by the rotation of the transfer drum 19 to the opposed parts (a transfer area 31) respectively of the photosensitive member 9 and the transfer drum 19 and an image of yellow toner is first transferred on to the transfer sheet 27. When the transfer drum 19 subsequently produces complete rotations, images of magenta, cyan, and black toners are transferred as superimposed onto the transfer sheet 27. Since the leading end of the transfer sheet 27 and each of these toner images are registered, all the toner images are superimposed in exact correspondence.

After all the toner images have been transferred, the transfer sheet 27 is relieved of charge by the first charge releasing device 23, separated from the transfer drum 19 by the separating device 24, caused to allow thermal fixture of the toner images thereon by a fixing device 32, and discharged into a paper discharge tray 33. The transfer drum 19 from which the transfer sheet 27 has been separated is relieved of charge by the second charge releasing device 25 and then deprived of residual toner particles by the cleaning device 26.

To detect the size of an original document placed on the document stand 29, a plurality of document size sensors SE20 are disposed at positions assigned to the particular sizes of document on the lower surface side of the document stand 29. The document size sensors SE20 are each formed as, for example, of a reflection photo-interrupter. Since the layout of the sensors SE20 and the mechanism of the detection of document size belong to the realm of prior art, they will be omitted from the description herein.

When a start button not shown in the drawings is pressed by an operator, a transfer sheet of a suitable size to be found on the basis of the document size read out by the document size sensors SE20 is selected from among the transfer sheets stored in a piled state within the upper and lower cassettes 28a, 28b. Subsequently, a pickup roller (not shown), a paper feed roller 203a (or 203b), and a separating roller 204a (or 204b) disposed in the cassette 28a or 28b, whichever has been selected, are exclusively set rotating by a paper feed motor (not shown) to convey the uppermost of the group of sorted transfer sheets 27 toward the transfer drum 19. At this time, the plurality of transfer sheets 27 are individually separated by the paper feed rollers 203a, 203b and the separating rollers 204a, 204b operated by the known technique and only one of the separated transfer sheets 27 is conveyed.

Scale and Shading correction plate

Figure 2:
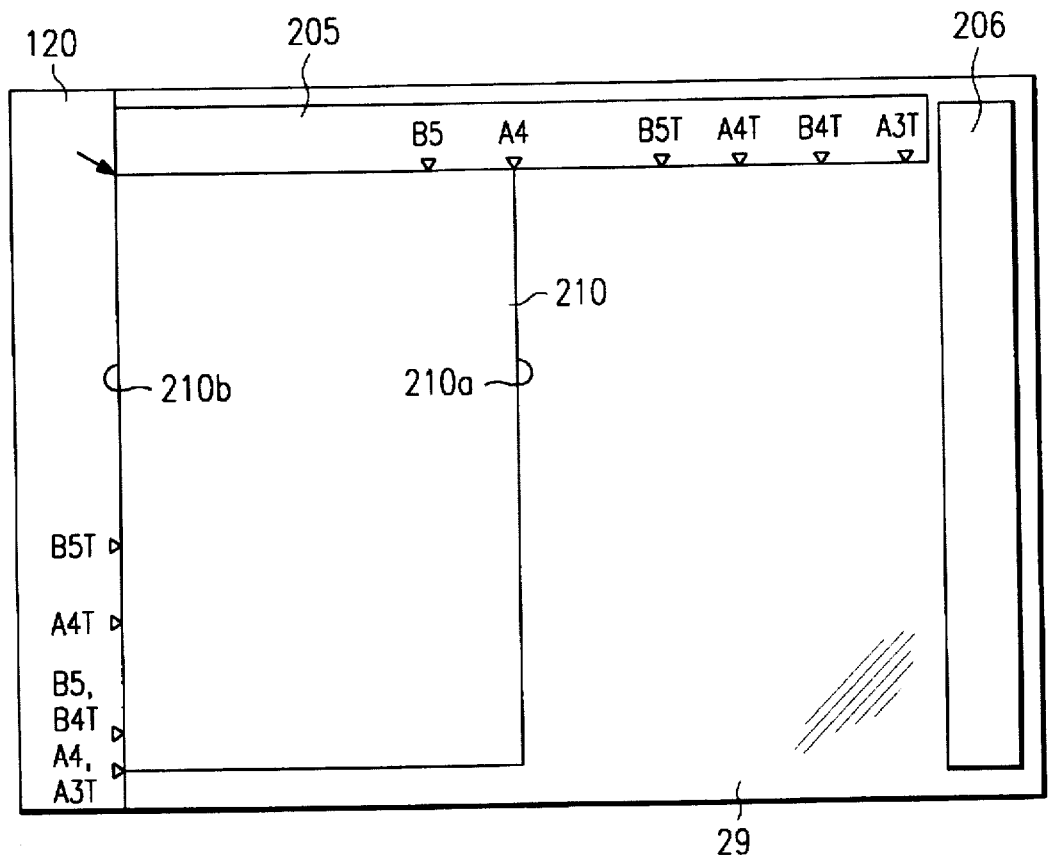
FIG. 2 is a plan view showing the glass top of the document stand of FIG. 1 as viewed from above.
Figure 3:
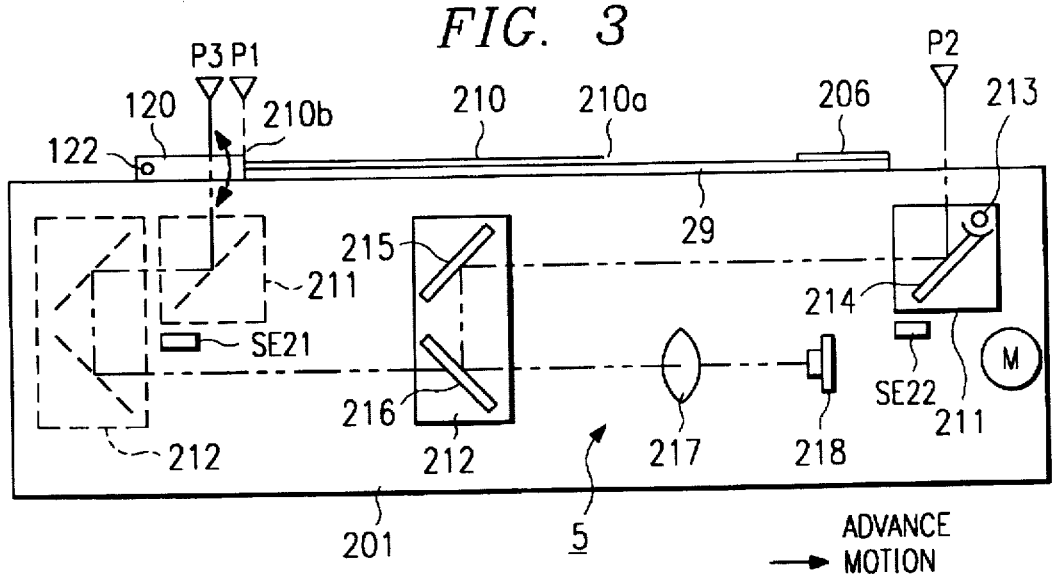
FIG. 3 is a diagram showing an optical system positioned within the image scanner unit of FIG. 1.

The document stand 29, as shown in FIG. 2 and FIG. 3, is provided in the left terminal part thereof in the diagrams with a scale 120 protruding to a stated height from the document stand 29. This scale 120 is graduated. The graduation is intended to enable an operator, while lifting the ADF 60 and manually setting an original document 210 on the document stand 29, to align one end of the original document 210 to the mark assigned to the selected document size. The scale 120 fulfills the function of forcibly stopping at standard reading position P1 the original document 210 which has been conveyed on the document stand 29 during the operation of the AFD 60 besides the function of indicating the position of the original document during manual exchange of original documents. The document stand 29 is further provided with a scale 205 in the upper terminal part thereof in the diagram. The left upper corner part formed jointly by the two scales 120 and 205 forms the standard point for the position at which the original document is to be placed. The scale 120 is set in place in such a manner as to be freely swung round a pin 122 as the center as will be described more specifically herein below. Thus, it serves as a movable scale.

The document stand 29 is further provided in the right terminal part in the diagram, with a shading correction plate 206, i.e. a standard white plate to be read during the shading correction. Particularly, this shading correction plate 206 is disposed on the document stand 29. Incidentally, the lower terminal side in FIG. 2 constitutes the front side or the foreground side of the main body of the copying device 1 and the upper terminal side in the diagram constitutes the back side or the receding side thereof.

Image Scanner unit

In the scanning optical system 5 of the image scanner unit 201, a first slider 211 and a second slider 212 are movably disposed as shown in FIG. 3. These two sliders 211 and 212 are moved by a scanner motor M align the direction of secondary scanning. Though the two sliders 211 and 212 during their motion travel in the same direction, the second slider 212 is moved at a speed one half of the speed of motion of the first slider 211. The first slider 211 is provided with lamp 213 for illuminating the original document on the document stand 29 and a mirror 214 and the second slider 212 is provided with two mirrors 215 and 216. The light emitted from the lamp 213 and reflected by the original document 210 or the shading correction plate 206 is reflected successively by the mirrors 214 through 216, passed through a lens 217, and focused on arrival at a color CCD sensor 218.

The sliders 211 and 212 prior to executing the operation of the shading correction and the operation of ACS are held at the positions indicated with a continuous line in FIG. 3. The first slider 211 is positioned and kept at rest slightly to the right in the diagram from directly below the shading correction plate 206. This position constitutes the waiting position P2 for the first slider 211. The positions which the sliders 211, 212 occupy before they execute the operation of reading an image of an original document are as indicated by a broken line in FIG. 3. The first slider 211 is stopped below the scale 120. This position is the position P3 of the first slider 211 for starting a scan. The original document 210 has the position thereof fixed by the collision thereof against the right side surface of the scale 120 in the diagram. The position corresponding to the position of the right side surface of the scale 120 in the diagram constitutes standard position P1 for actually reading the image of the original document. The motion which the sliders 211, 212 produce while reading the image of the original document, namely the motion of the sliders from the scan starting position P3 to the waiting position P2, is referred to as "advance." Conversely, the motion which the sliders 211, 212 produce in traveling from the waiting position P2 to the scan starting position P3 is referred to as "return."

The image scanner unit 201 is provided with a scan starting position sensor SE21 for detecting the fact that the first slider 211 is located at the scan starting position P3 and a waiting position sensor SE22 for detecting the fact that the first slider 211 is located at the waiting position P2 or the home position. These sensors SE21, SE22 are each formed of a limit switch, for example. They may be optionally formed of a non-contact type photo-interrupter. This invention does not particularly discriminate the sensors SE21, SE22 on account of the method of detection.

ACS Processing

This color copying device 1 is provided with an ACS unit. The ACS processing consists in automatically identifying an original document placed on the document stand by discriminating between a monochrome original document and a color original document and then setting copying conditions fit for the particular kind of original document.

First in the ACS processing, a first histogram is formed regarding numbers of picture elements at different brightness levels of a given original document and a second histogram regarding numbers of colorless picture elements at different brightness levels of the original document respectively based on the image data read out of the original document. The question of whether or not the individual picture elements are colorless is decided on the basis of the R, G, and B data of the picture elements. When the R, G, and B data happen to reveal only a slight difference, the relevant picture elements are judged to be colorless. From the first and second histograms, the data including the number of picture elements Wn of the background (white) within the original document, the number of colorless intermediate picture elements Mn, the number of black picture elements Bn, the number of color picture elements Cn and the total number of picture elements Sn within the original document are obtained. The judgment as to whether the original document is a monochrome document or a fully colored document rests on the proportion of color picture elements to the original document. Specifically, the decision falls on a fully-colored document when the value α of the decision formula, α=Cn/Sn, is found to exceed a prescribed standard value and on a monochrome document when it is found to fall short of the standard value. The influence of the size of the original document can be ignored when Sn is used for the denominator of the decision formula. The conditions for the radiation of the laser beam 8 by the laser exposure device 7 are set and the speed of the rotation of the motor for driving the transfer drum 19 is controlled in response to the outcome of the color/monochrome discrimination mentioned above.

The color CCD sensor 218 converts the reflected light from the original document 210 into electric signals representing the component colors of the reflected light. In connection with the color/monochrome discrimination, this color CCD sensor 218 reads the image of the original document by a rough scanning and takes in the data regarding picture elements to be suitably sampled out of the original document. This is because the formation of a histogram of the different brightness levels of all the picture elements in the original document calls for a large memory capacity and because the color/monochrome discrimination does not call for the data of all the picture elements involved. In the scan (regular scan) which is executed for the copying operation, the scanning is effected for each of the component colors. This is because the data of all the color components to be read out by the regular scanning cannot be spontaneously processed. In the color/monochrome discrimination, all the color components can be processed because the amount of data for rough scanning is small.

Operation of First Slider

The operation of the first slider 211 will be described here. The first slider 211 begins to return from the waiting position P2 and starts reading the shading correction plate 206 and reading the image of an original document 210. The scan is called a pre-scan and is discriminated from the regular scan which will be subsequently carried out. During the pre-scan, when the first slider 211 passes under the shading correction plate 206, a plurality of lines of data read out of the shading correction plate 206 are inputted into the CCD sensor 218 and shading data is obtained, based on the lines of data. When the first slider 211 which has passed under the shading correction plate 206 reaches a rear terminal 210a (the right terminal in FIG. 2) of the original document 210 whose size has been preparatorily detected by the document size sensor SE20, the reading of the image of the original document by the color CCD sensor 218 is started. This reading is continued until the first slider 211 reaches the leading terminal 210b (the left terminal in FIG. 2) of the original document, namely the standard reading position P1. The ACS processing mentioned above is carried out on the basis of the data of the image read out as described above. After having performed the ACS operation, the first slider 211 continues its travel from the standard reading position P1 and comes to a stop at the scan starting position P3 below the scale 120.

After the stop, the first slider 211 reverses the direction of travel and begins to return and starts the regular scan. When the first slider 211 reaches the standard reading position P1, it starts reading the image of the original document. The scan starting position P3 is separated from the standard reading position P1 by a length required for the motions of the slider 211, 212 during the reading of image to be accelerated to a prescribed speed.

Since the size of the original document is detected in advance and further since the waiting position P2 of the first slider 211 and the position for disposing the shading correction plate 206 are set on the opposite side to the standard reading position P1 relative to the document stand 29, the shading correction and the ACS operation can be carried out while the first slider 211 is in the process of returning. In order words, the shading correction and the ACS operation can be performed within the span of the time required for the first slider 211 to return from the waiting position P2 to the scan starting position P3 in preparation for the reading of the image of the original document.

In contrast, the conventional copying device cannot carry out the shading correction, the size detection of the original document, and the ACS operation unless it consumes the time required by the first slider in completing one reciprocation because it sets the waiting position of the first slider on the same side as the standard reading position.

As compared with the conventional copying device, therefore, the copying device 1 of this embodiment is enabled to curtail the time required for the production of the first copy because the sliders 211, 212 produce no wasteful motion and, as a result, the actual operation of reading the image of the original document can be started early and the image of the original document can be quickly read. Further, generally the speed of the travel of the first slider 211 during the return is about four to eight times the speed of the travel thereof during the advance for reading the image of the original document at a unitary rate. The copying device of this embodiment, therefore, permits the time itself necessary for the pre-scan to be shortened in a great measure because it performs the ACS operation at a speed more than four times the speed of the reading at the unitary rate.

In the embodiment described above, the color/monochrome discrimination has been cited as a concrete example of the processing prior to the regular scan. The processing which ought to precede the regular scan, however, need not be limited to the color/monochrome discrimination but may be whatever can discern the contents of the original document in advance and switch the control of the regular scan in conformity with the outcome of the discernment.

This processing, for example, is even capable of discerning whether the original document to be read is a document containing letters exclusively or a document containing an image of intermediate tone like a photograph and, in response to the outcome of the discernment, switching the control during the regular scan. The judgment as to whether or not the original document contains an image of intermediate tone depends on the histogram formed from the image data to be read out. In the original document containing letters exclusively, the brightness levels are concentrated on either brightness or darkness. When the number of picture elements falls short of the prescribed standard value as when the brightness levels concentrate on an intermediate, the original document is judged to be a document containing letters exclusively. When the number exceeds the prescribed standard value, the original document is judged to be a document containing an image of intermediate tone. It now suffices to vary the degree of image resolution or the density in conformity with the outcome of the discrimination.

Demand confronting ADF

The ADF is confronted by the following problems.

The copy modes which use the ADF embrace the so-called "two-in-one mode" in which the copying device is caused to implement automatic conveyance of two original documents simultaneously and, when the original documents are in an A4 size, copy the images of the two original documents parallel on a size A3 recoridng papter or, by desingating size contraction, on a size A4 recording paper.

Figure 19A:
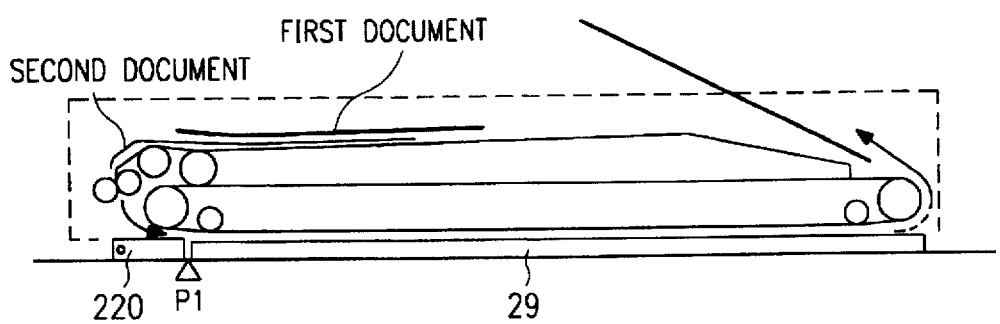
FIG. 19A, FIG. 19B, and FIG. 19C are diagrams to aid in describing the demands placed on an automatic document feeder (ADF)
Figure 19B:
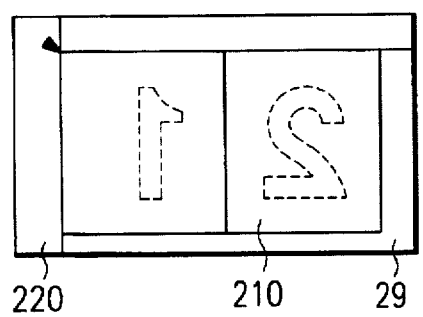
Figure 19C:
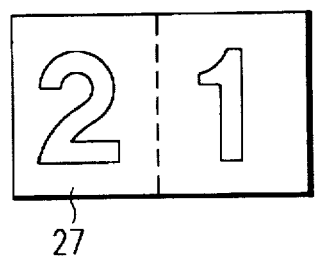

A scale 220, as shown conceptually in FIG. 19A, is generally disposed on the side opposite to the terminal position of the document stand 29 along the direction of conveyance of an original document which falls on the document inlet side of the ADF, namely the upstream side terminal part. Thus, the document inlet of the ADF and the standard reading position P1 of the copying device occur of one same side. When the copying is carried out in the two-in-one mode mentioned above, therefore, the order in which the two original documents are set in place on the document stand is reversed from that of the serial page numbers of the documents (FIG. 19B) by the mechanism of conveyance of original documents and consequently the order of page numbers of the produced copies is likewise reversed (FIG. 19C).

Figure 20A:
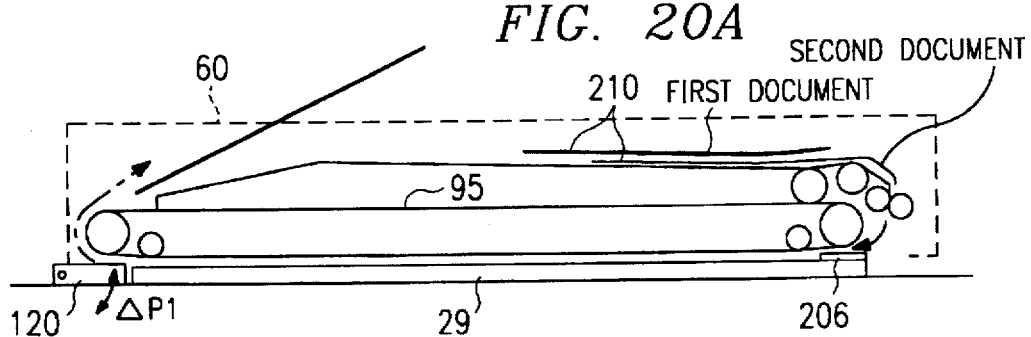
FIG. 20A, FIG. 20B, and FIG. 20C are diagrams to aid in describing the operation of copying serial pages.
Figure 20B:
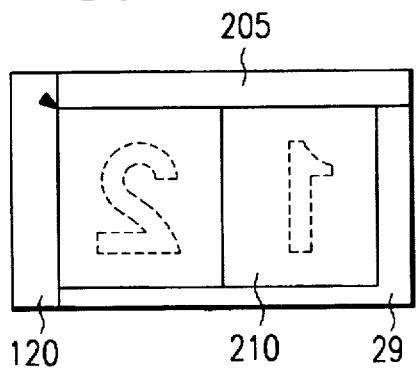
Figure 20C:
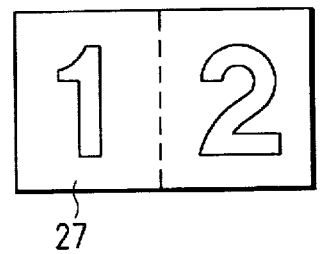

To preclude this problem, the operator while setting given original documents on the ADF must reverse them upside down. This work turns out to be very unnatural and troublesome from the viewpoint of the operational convenience of the copying device. From the viewpoint of saving the operator from this operational inconvenience during the operation in the two-in-one mode, it is safe to conclude that the document inlet of the ADF appropriately falls on the side opposite to the standard reading position P1 of the copying device (FIGS. 20A, 20B, and 20C).

In this case, a movable scale 120 must be adopted because the document outlet side of the ADF 60 naturally falls on the same side as the standard reading position P1. In other words, the scale 120 which is used for enabling an original document being introduced into the printing device to be set in place by the collision between itself and the document must be capable of retracting the colliding portion thereof enough to avoid interfering with the subsequent discharge of the original document.

Figure 21A:
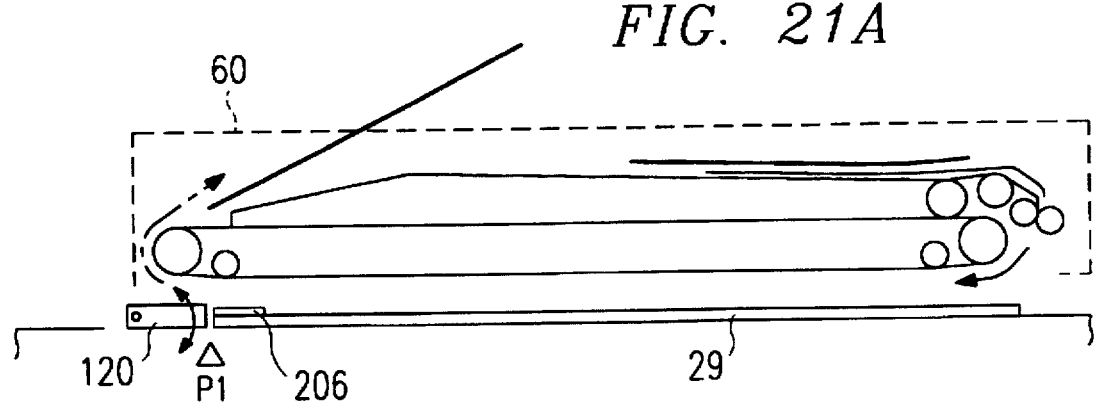
FIG. 21A and FIG. 21B are diagrams to aid in describing the layout of the shading correction plate when a movable scale is disposed on the document discharge side of the ADF unit.
Figure 21B:
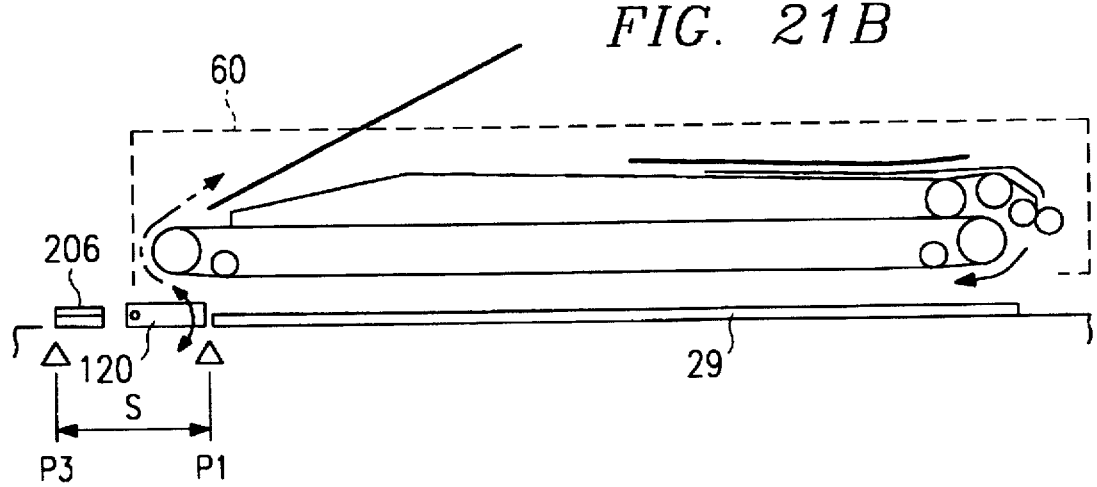

When the shading correction is to be effected in the copying device 1 which is provided on the document outlet side of ADF 60 with the movable scale 120, the selection of the site for disposing the shading correction plate 206 poses a problem. When the shading correction plate 206 is disposed on the standard reading position P1 side at the position shown in FIG. 21A as generally selected, a missing part inevitably occurs in the area for reading the original document. For the purpose of precluding the occurrence of such a missing part from the reading area, the shading correction plate 206 must be disposed on the upstream side of the scale 120 relative to the direction of the reading operation of the slider as shown in FIG. 21B. The layout thus obtained no longer deserves designation as an appropriate plan from the viewpoint of miniaturizing a copying device because the length S, over which the slider is required to move the leading end of the original document from the scan starting position P3 to the position for actually starting the reading is unduly elongated.

As a breakthrough, an idea of attaching the shading correction plate 206 to the rear side of the movable scale 120 may be conceived. In this arrangement, however, the shading correction plate 206 is read outside the document stand 29 and, because the scale 120 is of a movable type, the shading correction plate 206 cannot be easily set flush with the original document. Since the shading correction plate 206, therefore, is inevitably required to be read under conditions different from those under which the original document is read, the correction of shading cannot be accurately carried out.

It is, therefore, safe to conclude that, from the viewpoint mentioned above, the shading correction plate 206 is disposed more advantageously at a position on the opposite side to the standard reading position P1 as in the present embodiment than at a position on the same side as the standard reading position P1 relative to the document stand 29.

In view of the points mentioned above, the ADF of the present embodiment is constructed as shown below.

Construction and Operation of ADF

Figure 4:
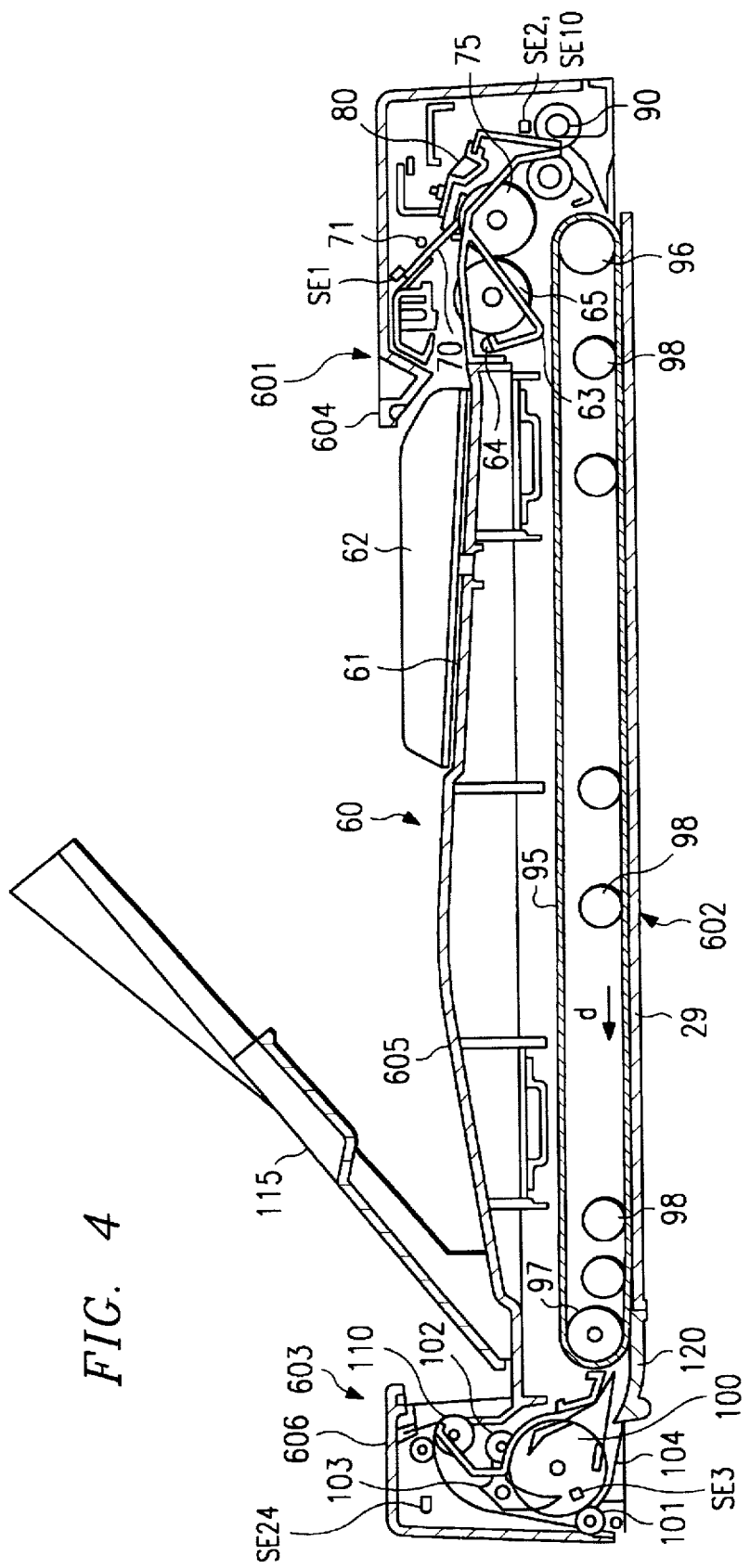
FIG. 4 is a cross section showing the automatic document feeding device of FIG. 1, FIG. 5 through FIG. 8 are cross sections for aiding in describing the operating condition of the movable scale of FIG. 4.

The construction and the operation of the ADF 60 will be described in detail below. The construction and the operation of the ADF 60 will be explained with reference to FIG. 4. The ADF 60 is roughly composed of a document feeding part 601, a document conveying part 602, and a document discharging part 603. The document feeding part 601 is provided with a document tray 61, a front regulating plate 63, a pickup roller 65, a document pressing plate 70, a riffling roller 75, a riffling pad 80, and a resist roller 90. These component parts of the docuemtn feeding part 601 except the document tray 61 are covered with a freely switching cover 604. The document conveying part 602 is provided with a drive roller 96 disposed in the proximity of the document feeding part 601, a driven roller 97 disposed in the proximity of the document discharging part 603, and a conveyor belt 95 and these component parts are covered with a cover 605 which concurrently forms the document tray 61. The document discharging part 603 is provided with a reverse roller 100, a discharge roller 110, and a discharge paper tray 115. These component parts except the discharge paper tray 115 are covered with a freely switching cover 606.

The ADF 60 is disposed on the upper side of the main body of the copying device 1 so that the conveyor belt 95 may be positioned on the document stand 29. It is adapted to be opened relative to the upper side of the document stand 29 by means of a hinge fitting (not shown) disposed on the receding side, namely on the opposite side to the operating side.

The operator, prior to manually setting an original document on the document stand 29, raises the ADF 60 upwardly around the hinge fitting to expose the upper side of the document stand 29 to the ambience. A magnet sensor SE23 shown in FIG. 1 detects the opening and the closing motion of the ADF 60. The operation of the ADF 60 is not allowed to start until this sensor SE23 detects the fact that the ADF 60 is perfectly closed.

The original documents to be fed are piled up on the document tray 61 in such a state that the first page thereof may be directed upwardly. At this time, the original documents have the positions thereof adjusted in the direction of width by a side regulating plate 62 and the leading ends thereof adjusted by the front regulating plate 63. The front regulating plate 63 and the pressing plate 70 are adapted to be rotated respectively about supporting shafts 64, 71 as fulcrums. The front regulating plate 63 is kept retracted downwardly while the feeding of original documents is in process, namely between the time that the feeding of the first of them is started and the time that the feeding of the last of time is completed. When the first sheet of the original documents is fed, the pressing plate 70 moves downwardly from the position of retraction shown in FIG. 4, presses the leading end part of the original document against the pickup roller 65, and imparts a paper feeding pressure thereto.

The pickup roller 65 and the riffling roller 75 are severally driven clockwise while the feeding of papers are in process. The original documents are forwarded one after another from the lowermost sheet upward, passed through the gap between the riffling roller 75 and the riffling pad 80, and delivered to the resist roller 90. The resist roller 90 causes the received original document to be kept waiting briefly at the nip part thereof. After the elapse of a prescribed interval, it is set rotating to convey the original document to the inlet of the document stand 29.

The conveyor belt 95 is stretched endlessly and passed around the drive roller 96 and the driven roller 97 so as to cover the whole surface of the document stand 29. Inside the conveyor belt 95, a multiplicity of backup rollers 98 are rotatably disposed so as to keep the conveyor belt 95 in tight contact with the document stand 29. The conveyor belt 95 is rotationally driven in the direction of an arrow mark d so as to set the leading end of the original document at the standard reading position (exposure standard) P1 at which exposure is attained through the boundary between the scale 120 and the document stand 29.

In the proximity of the reverse roller 100 are disposed pinch rollers 101, 102 and a changeover claw 103. The changeover claw 103 is provided for the purpose of switching the path for paper so as to turn an original document upside down while the copying device is operated in the double-face original document mode for copying both sides of the original document bearing images on both sides. Usually, the changeover claw 103 is set at the position indicated by the solid line. After the exposure is completed, by the rotation of the conveyor belt 95 in the direction of the arrow mark d and the clockwise rotation of the reverse roller 100, the original document is discharged from the upper side of the document stand 29, guided upwardly jointly by a guide plate 104 and the changeover claw 103, and discharged by the discharge roller 110 onto the discharge paper tray 115. In the case of a double-face original document, since the second face (reverse face) thereof first is subjected to the operation of copying. The double-face original document, therefore, is prepared for delivery onto the document stand 29 by having the changeover claw 103 rotated clockwise by a prescribed angle from the state shown in the diagram. Then, the double-face original document is conveyed as reversed round the reverse roller 100 and returned onto the document stand 29 with the second face directed downwardly. In this while, the conveyor belt 95 is rotationally driven in the direction opposite to the direction of the arrow mark d. The double-face original document, after completion of the exposure of the second face thereof to light, is conveyed as reversed again round the reverse roller 100 to prepare the first face (obverse face) thereof for the copying operation.

The reverse roller 100 and the discharge roller 110 mentioned above are rotationally driven by a discharge motor. The ADF 60 is provided with various sensors SE1, SE2, SE3, SE10, and SE24 which are adapted to detect an original document. The sensor SE1 detects the presence or absence of an original document on the tray 61. The sensor SE2 is disposed directly in front of the resist roller 90 and adapted to detect the arrival and passage of an original document. The sensor SE2 further serves the purpose of cooperating with a timer in detecting the length of an original document at the time the original document is sent out of the resist roller 90. The sensor SE10 is disposed parallel to the sensor SE2 and adapted to detect the size of an original document in the direction of width. Based on the signals on the detection of an original document by the sensors SE2 and SE10, the decision as to whether the original document is advancing longitudinally (with the longer side of original document parallel to the direction of conveyance) or laterally (with the shorter side parallel to the direction of conveyance) is made. The sensors SE2 and SE10, therefore, function as means for detecting the size of an original document. The sensor SE3 is disposed in the inlet of the reverse roller 100 and adapted to detect the passage of an original document there-through. The sensor SE24 is disposed in the inlet of the discharge roller 110 and adapted to discern completion of the discharge of an original document by detecting the rear end of the original document passing the inlet part.

Description of Scale 120, etc.

The scale 120 is disposed in the downstream side terminal part of the document stand 29 in the direction of conveyance of the original document as opposed thereto and, as shown in FIGS. 5 through 8, attached rotatably about the pin 122 as a fulcrum held in place by holders 121 provided one each on the background and the foreground side of an upper frame 2 of the main body of the copying device 1, with the leading end or the document stand 29 side thereof urged upwardly with a spring 123.

This scale 120 is provided on the bottom thereof with a projection 120a opposed to the upper frame 2 and a projection 120b thrust into the empty space below the document stand 29, in the lower part of the leading end face 120c thereof with an involution preventing portion 120f thrust toward the terminal face of the document stand 29, in the upper part on the recessing side thereof with a lever colliding portion 120d, and in the upper end corner part on the leading end side thereof with a plurality of notches 120e of a prescribed length.

Figure 5:
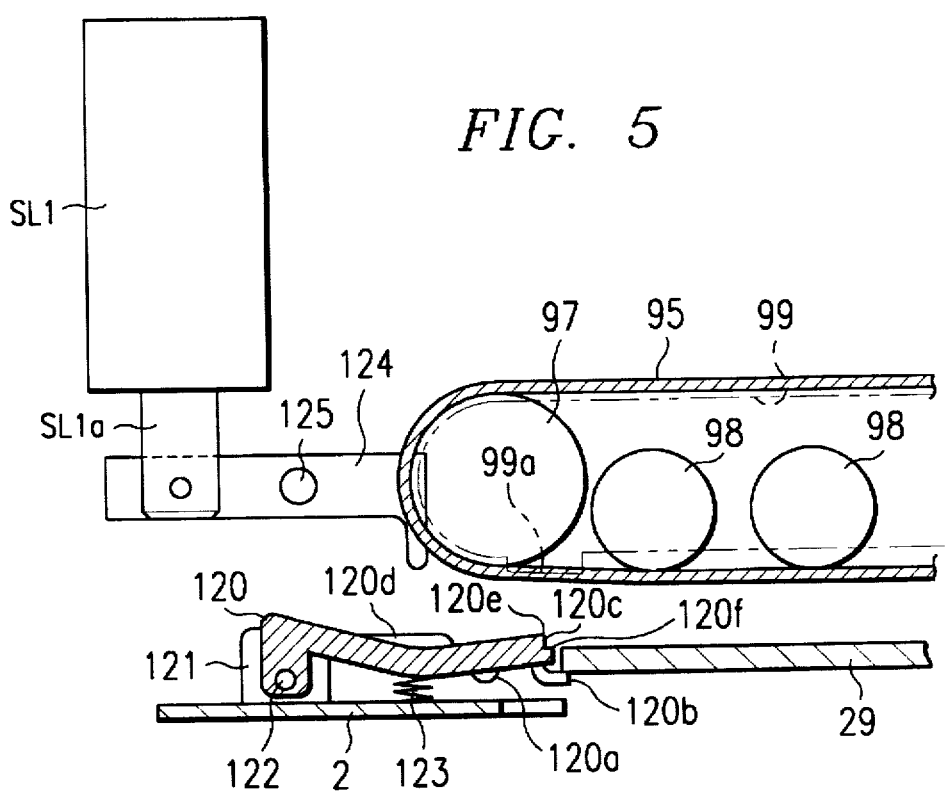
Figure 6:
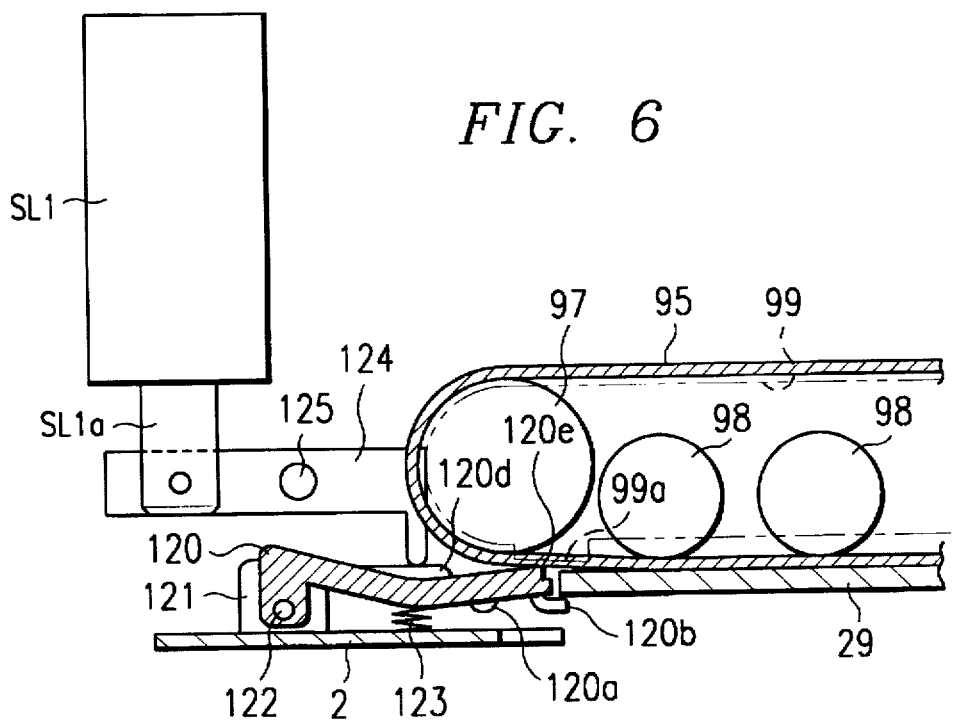

In the arrangement described above, when the ADF 60 is in an opened state relative to the main body of the copying device 1 as shown in FIG. 5, the scale 120 has the projection 120b thereof kept in contact with the lower side of the document stand 29 by dint of the urging force of the spring 123 and the leading end thereof set in place as thrust to a prescribed height from the document stand 29. In the ensuant state of the scale 120, the involution preventing portion 120f at the leading end of the scale is retained below the upper side of the document stand 29. The original document placed on the document stand 29, therefore, is accurately set in place with one end part thereof held against the leading end face 120c of the scale.

When the ADF60 is kept in a closed state relative to the main body of the copying device 1, the rollers 96, 97 and a projection 99a of a frame 99 supporting the conveyor belt 95 are held in collision with the scale 120 and the scale 120 is held in such a state that the leading end part thereof contacts the conveyor belt 95 and protrudes to a prescribed height from the upper side of the document stand 29. At this time, the scale 120 is set so as to fall slightly from the state shown in FIG. 5. This frame 99 is held in place parallel to the document stand 29 with a positioning member which is omitted from illustration. When the ADF 60 is attached to the main body of the copying device 1, therefore, the positional relation between the leading end of the scale 120 and the conveyor belt 95 supported by the frame 99 and the state of contact thereof can be easily and infallibly retained appropriately. As a result, the original document can be infallibly regulated by the scale 120 because the rotation of the scale 120 no longer requires any adjustment and the possibility of the original document escaping the regulation enforced by the scale 120 on its travel owing to insufficiency of the force or amount of contact is nil. Further, the accuracy with which the original document is stopped when the leading end of the original document collides against the scale 120 is augmented and the skew (oblique motion) can be corrected infallibly.

Figure 7:
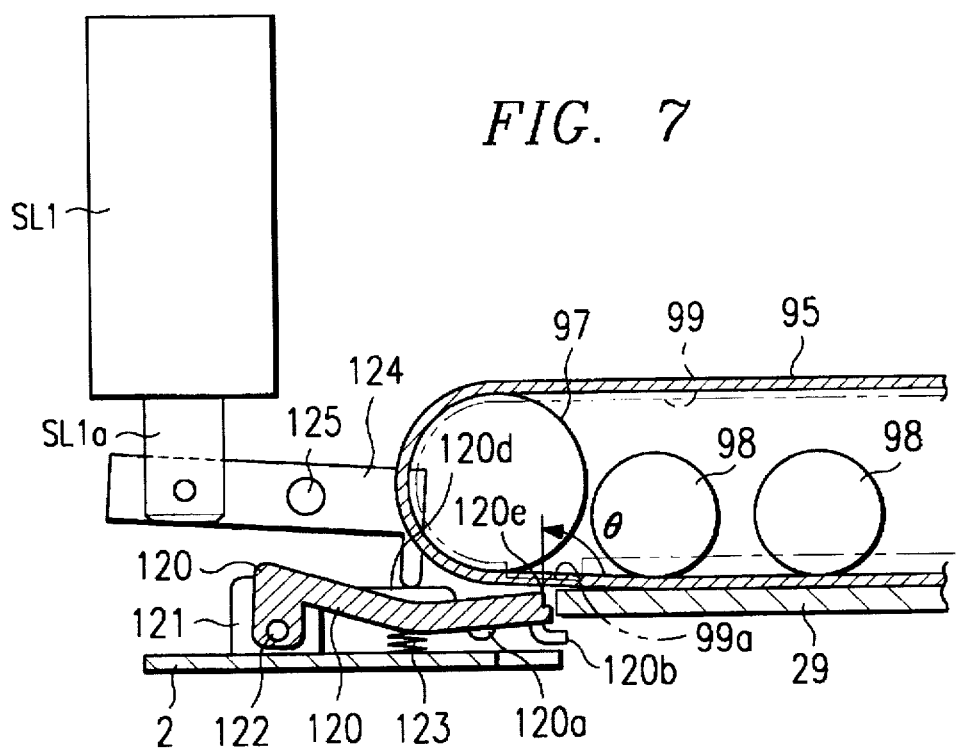
Figure 8:
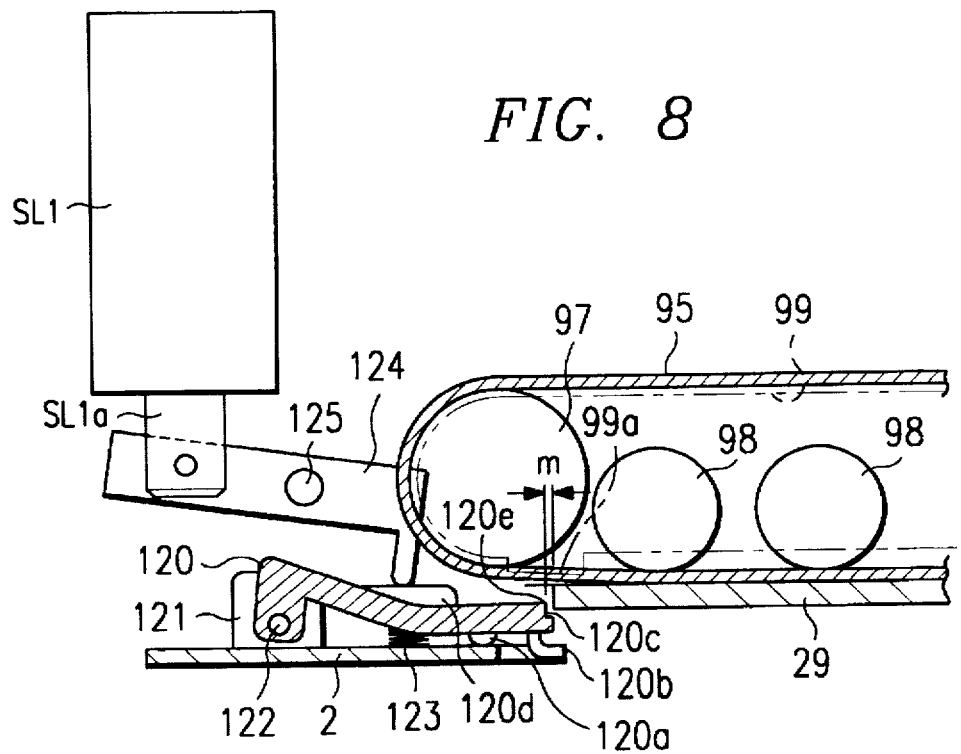

A lever 124 for rotating the scale 120 is rotatably supported through a supporting shaft 125 provided on an inner frame (not shown in the drawing) of ADF 60. One end of the lever 124 is connected to a plunger SL1a of a solenoid SL1. When a state of the solenoid SL1 is changed from OFF state to ON state, the lever 124 collides with the lever colliding portion 120d and the scale 120 rotates clockwise and the leading end of the scale 120 is thrusted and lowered below the document stand 29 as shown in FIGS. 7 and 8.

As a result of the adoption of the aforesaid construction, the original document which is fed on the glass top of the document stand 29 from the right side to the left side in reference to the diagram in response to the movement of the conveyor belt 95 in the direction of the arrow mark d is stopped by the collision of the terminal part thereof located in the downstream side of the direction of conveyance with the leading end face 120c of the scale 120. And then, on the part of the main body of the copying device 1 an operation of the exposure is started. After completion of the exposure, the state of the solenoid SL1 is changed from OFF state to ON state and the lever 124 rotates in the clockwise direction in reference to the drawing around the supporting shaft 125 as a fulcrum for pushing the lever colliding portion 120d. Thereby, the scale 120 rotates in the clockwise direction of the drawing around the supporting shaft 122 and the leading end of the scale 120 is lowered below the glass top of the document stand 29 and then the original document is conveyed to the document discharge side (in the left side) with the movement of the conveyor belt 95.

When the supporting shaft 122 for rotating the scale 120 is disposed below the glass top of the document stand 29, a clearance m (FIG. 8) between the leading end face 120c of the scale 120 and the document stand 29 becomes smaller in response to a descent of the scale 120. An angle θ (FIG. 7) with the leading end face 120c of scale 120 in reference to the glass top of the document stand 29 is set to have more than 90 degrees in reference to the direction of conveyance of the original document when the scale 120 descends below the glass top of the document stand as well as when the scale 120 projects beyond the glass top of the document stand. On condition that the scale 120 is located below the document stand 29, the original document consequently passes through the leading end part of the scale 120 with ease by raising the leading end thereof for the reason of stiffness in itself and a guide function of the angle θ even through the leading end of the original document is caught in the leading end face 120c of the scale 120. Accordingly, the original document is prevented from being involved with the clearance between the scale 120 and the document stand 29. A jam and a damage to the leading end part of the original document are prevented from occurring also.

Description of control system

Figure 9:
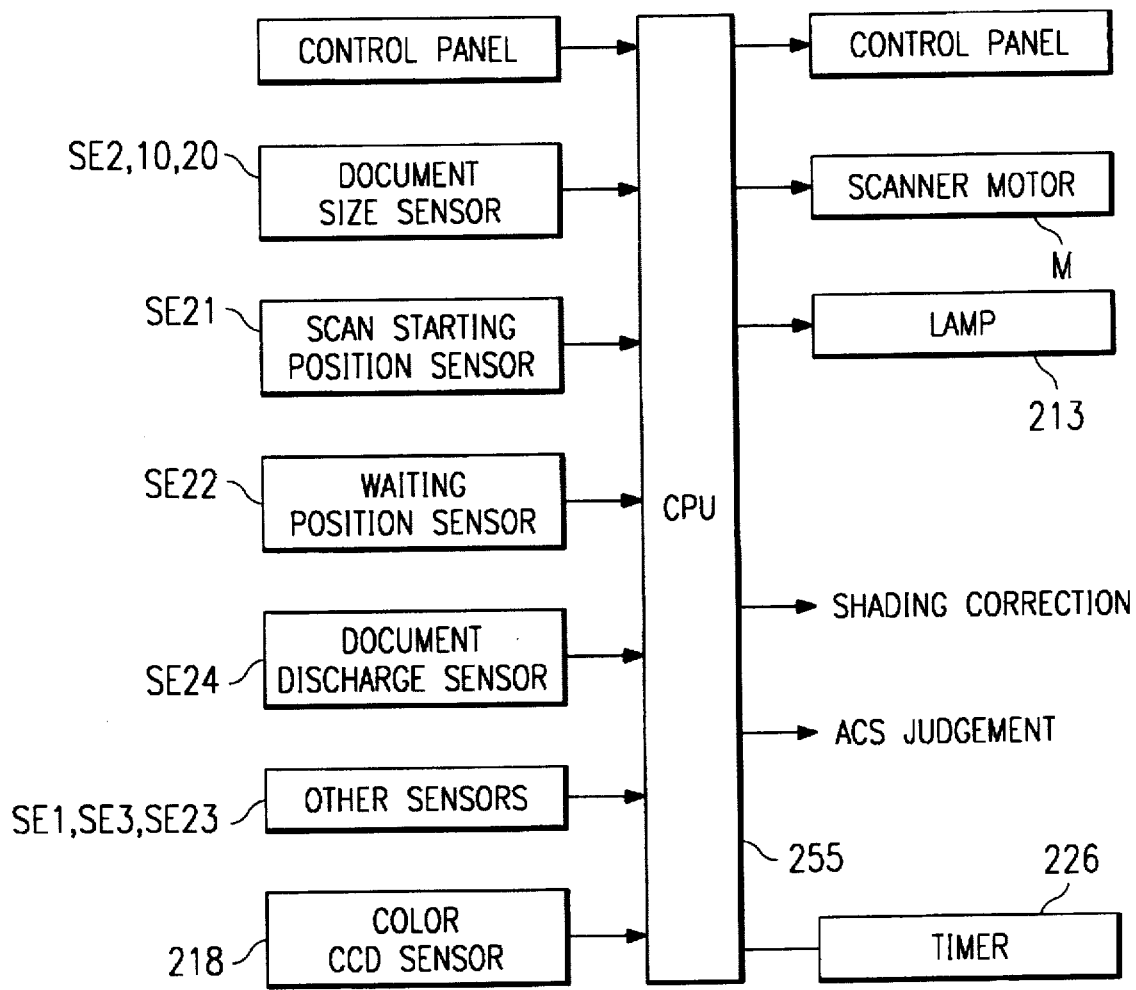
FIG. 9 is a block diagram showing a control system for controlling the actuation of the image scanner unit of a copying device.

FIG. 9 is a block diagram showing a control system for controlling the actuation of the image scanner unit of a copying device. CPU 225 is connected to a control panel, the document size sensors SE20, SE2, SE10, a scan starting position sensor SE21, a waiting position sensor SE22 and a color CCD sensor 218. And the CPU 225 accepts a signal corresponding to an operation set through the control panel by an operator, a detection signal of the document size, a detection signal of the first slider 211 disposed at the scan starting position P3, a detection signal of the first slider 211 disposed at the waiting position P2 and a read signal of the shading correction plate 206 or the image data of the original document. Further, the CPU 225 is connected to the document discharge sensor SE24 provided in the ADF 60, various sensors SE1, SE3 for detecting the original document, the magnet sensor SE23, etc. and accepts a detection signal of completion of the document discharge, for example. And the CPU 225 is connected to a timer 226 for synchronizing with various events such as acquisition of the shading data. The CPU225 outputs a signal for presenting prescribed data on a display unit provided in the control panel, a control signal of the scanner motor M and a control signal for lighting or extinguishing the lamp 213 of the first slider 211.

The CPU 225 fulfills functions as the shading corrector, the document distinct processor, the pre-process controller, image read controller and a controller and outputs a signal corresponding to the outcome of the shading correction and a signal corresponding to the outcome of the ACS judgment into the printer unit 202, for example.

Figure 15:
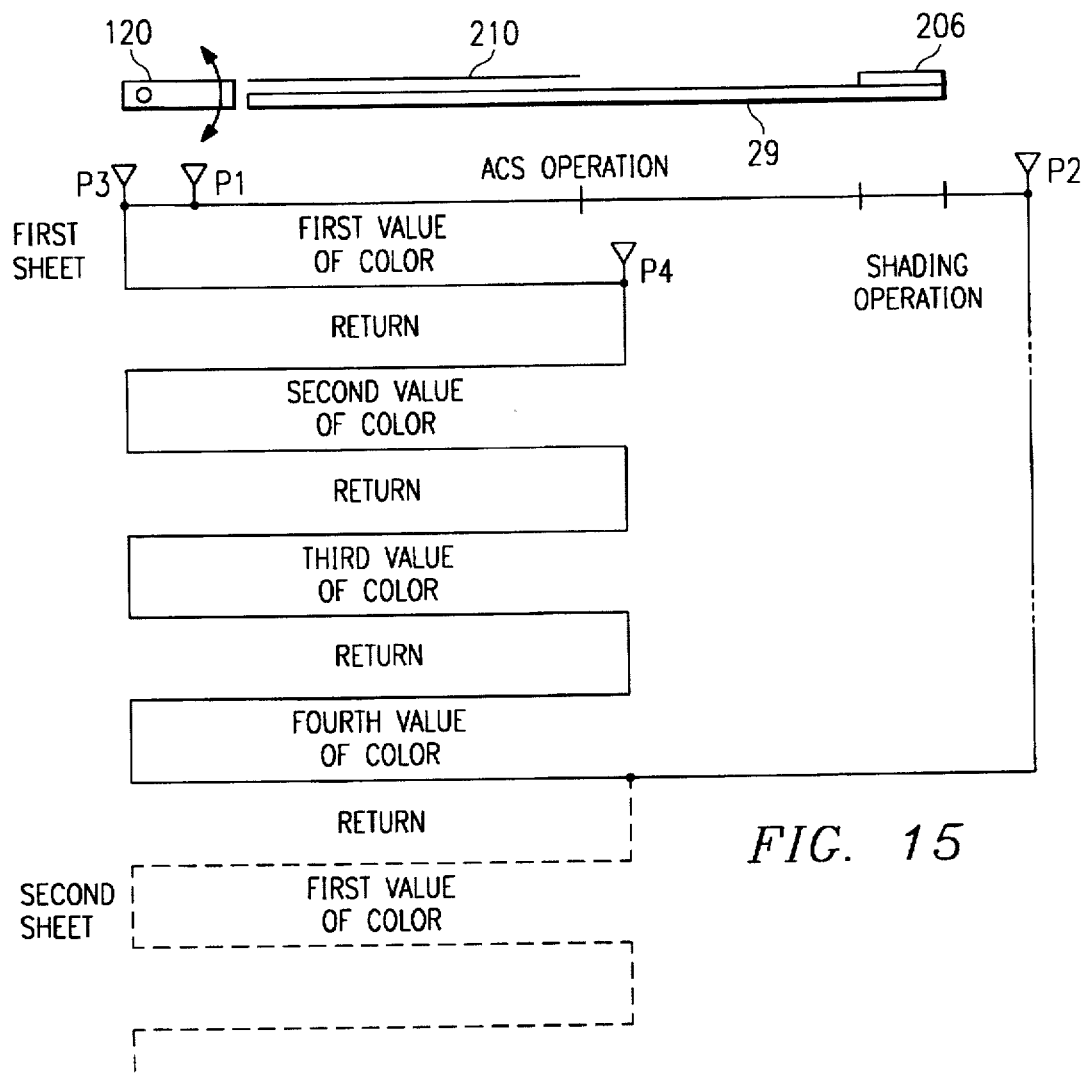
FIG. 15 is an explanatory diagram depicting the artist's concept of the operation of the first slider during the process of copying a color original document.
Figure 16:
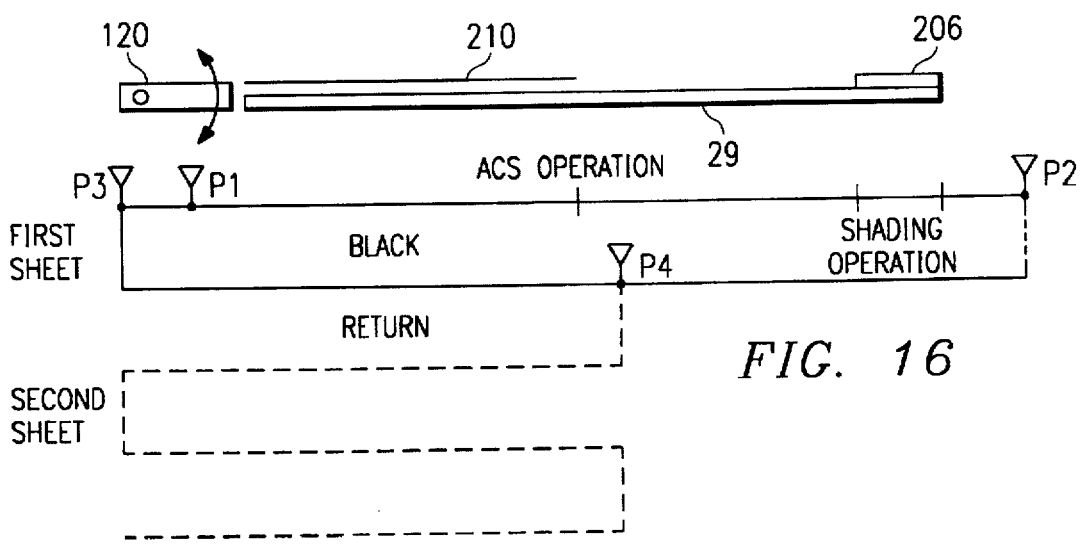
FIG. 16 is an explanatory diagram depicting the artist'concept of the operation of the first slider during the process of copying a monochrome original document.

An operation of image scanner unit 201 in a series of copying operations will be explained hereunder in reference to flow charts shown in FIGS. 10–13. Though an operation of the first slider 211 will be only explained, the second slider 212 is moved in the same direction at a speed one half of the speed of the first slider 211. FIG. 15 is an explanatory diagram conceptually depicting the operation of the first slider 211 during the process of copying a color original document. FIG. 16 is an explanatory diagram conceptually depicting the operation of the first slider 211 during the process of copying a monochrome original document.

Operation of manually setting single sheet of document

An explanatory will be made on condition that single sheet of the original document is manually set on the document stand.

As shown in FIG. 3, the first slider 211 is first positioned and stands still at the waiting position P2 located slightly to the right from directly below the shading correction plate 206 and the waiting position sensor SE22 detects the first slider 211 being at the waiting position P2. As shown in FIG. 2, the original document 210 is disposed along the scales 120 and 205. In addition, the document size of the original document 210 was detected by a plurality of document size sensors SE20, sensors SE2 and SE10 of the ADF 60, etc. at a point of time such as the document cover or the ADF 60 was closed.

An outline of the next operation will be explained, based on the flow chart shown in FIG. 10. When an operator pushes the start button (S1), the first slider 211 starts to return from the waiting position P2 toward the scan starting position P3. During the return motion of the first slider 211 the shading correction processing is executed (S2) and then ACS processing is executed (S3). The first slider 211 travels beyond the standard reading position P1 as far as the scan starting position P3. After the stop, the first slider 211 starts to advance from the scan starting position P3 to the waiting position P2. During the advance motion of the first slider 211, the image data reading processing according to the color document or monochrome document is done in response to the outcome of the ACS judgment executed in step S3 (S4). After completion of the reading processing, the first slider 211 comes to a stop at the terminal position P4 (FIGS. 15 and 16) for reading (S5). The reading terminal position P4 depends on the document size. Subsequently, it is judged whether or not the number of the produced copies reaches a setting value (S6). If the number of the produced copies is less than the setting value, the first slider 211 begins the return motion from the reading terminal position P4 to the scan starting position P3 and returns to step S4 for executing the image data reading processing again (S4). On the other hand, if the number of the residual copies is judged at a zero, it is furthermore judged whether or not the next document is in existence (S8). In the present case, it is judged that the next document can not be found because of the manual setting. As a result, the first slider 211 advances from the reading terminal position P4 toward the waiting position P2 and then stops at the waiting position P2 and now, the operation of the image scanner unit 201 ends (S9). Step S10 is a processing which is executed on condition that the original documents are automatically conveyed with the ADF 60 and it is judged that the next document stands in readiness (S8). The details of step S10 will be described later.

Next, the shading correction processing (S2), the ACS processing (S3) and the image data reading processing (S4) will be explained in due order.

According to the shading correction processing (S2) as shown in FIG. 11, lighting of the lamp 213 of the first slider 211 is done (S21), and the scanner motor M is driven and the first slider 211 starts to return from the waiting position P2 to the scan starting position P3 (S22). The beginning of the return motion causes the shading timer 226 to start (S23). When it is detected on the basis of the number of counts done by the timer 226 that the first slider 211 reaches the shading correction plate 206, a plurality of the lines of data are inputted into the color CCD sensor 218 during the passage of the first slider 211 under the shading correction plate 206. The lines of data continues to be inputted until it is judged from the timer 226 that a prescribed setting time passes (S24), and from the inputted data the shading correction data is obtained (S25). And the present flow of the program returns to the step S3 as shown in FIG. 10.

In this case, the shading correction plate 206 is disposed on the document stand 29. Namely, the shading correction plate 206 exists at the same altitude as the original document exists and is read through the document stand 29 also. Consequently, the reading of the shading correction plate 206 can be done in the same condition as the reading of the image data of the original document and thereby, the shading correction is very accurate.

Figure 12:
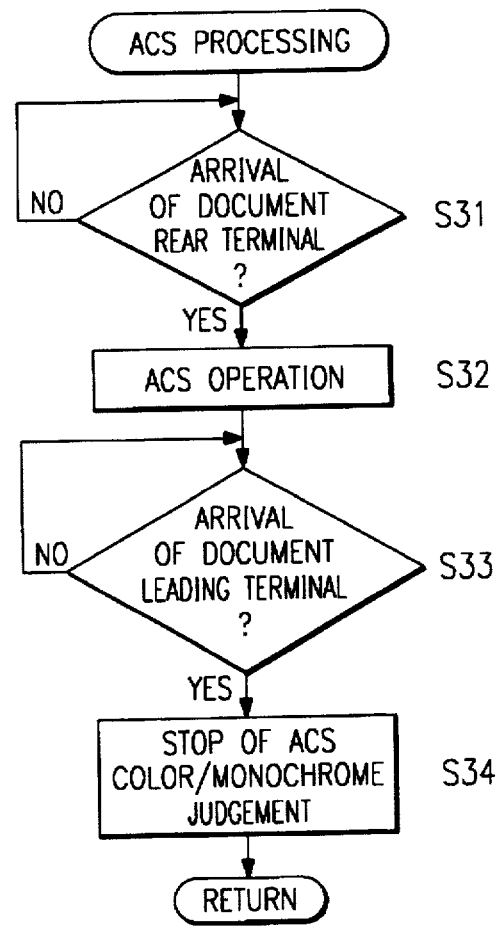
FIG. 12 is a flow chart of the ACS processing routine of FIG. 10.

According to the ACS processing (S3) as shown in FIG. 12, when the first slider 211 which has passed under the shading correction plate 206 reaches the rear terminal 210a (FIG. 2) of the original document 210 whose size has been preparatorily detected (S31), the color CCD sensor 218 starts to read the image (S32), and this reading is continued until the first slider 211 reaches the leading terminal 210b of the original document, namely the standard reading position P1 (S33). Next, the histogram is formed from the image data and the color/monochrome judgment according to the document 210 is done (S34). Besides, the first slider 211 continues the movement after completion of the ACS processing. In other words, the first slider 211 keeps up the return motion through the standard reading position P1 toward the scan starting position P3.

In the copying device 1 according to the embodiment, the shading correction and the ACS may be executed during the return motion of the first slider 211 from the waiting position P2 to the scan starting position P3 for the purpose of the preparation for the reading of the document image. As a result, the movement of the sliders 211, 212 has no redundancy and the time required for the production of the first copy is shortened. In addition, by reason of the execution of the ACS during the return motion at the speed more than the speed of the advance motion, a required time for the pre-processing itself is substantially reduced.

Figure 13:
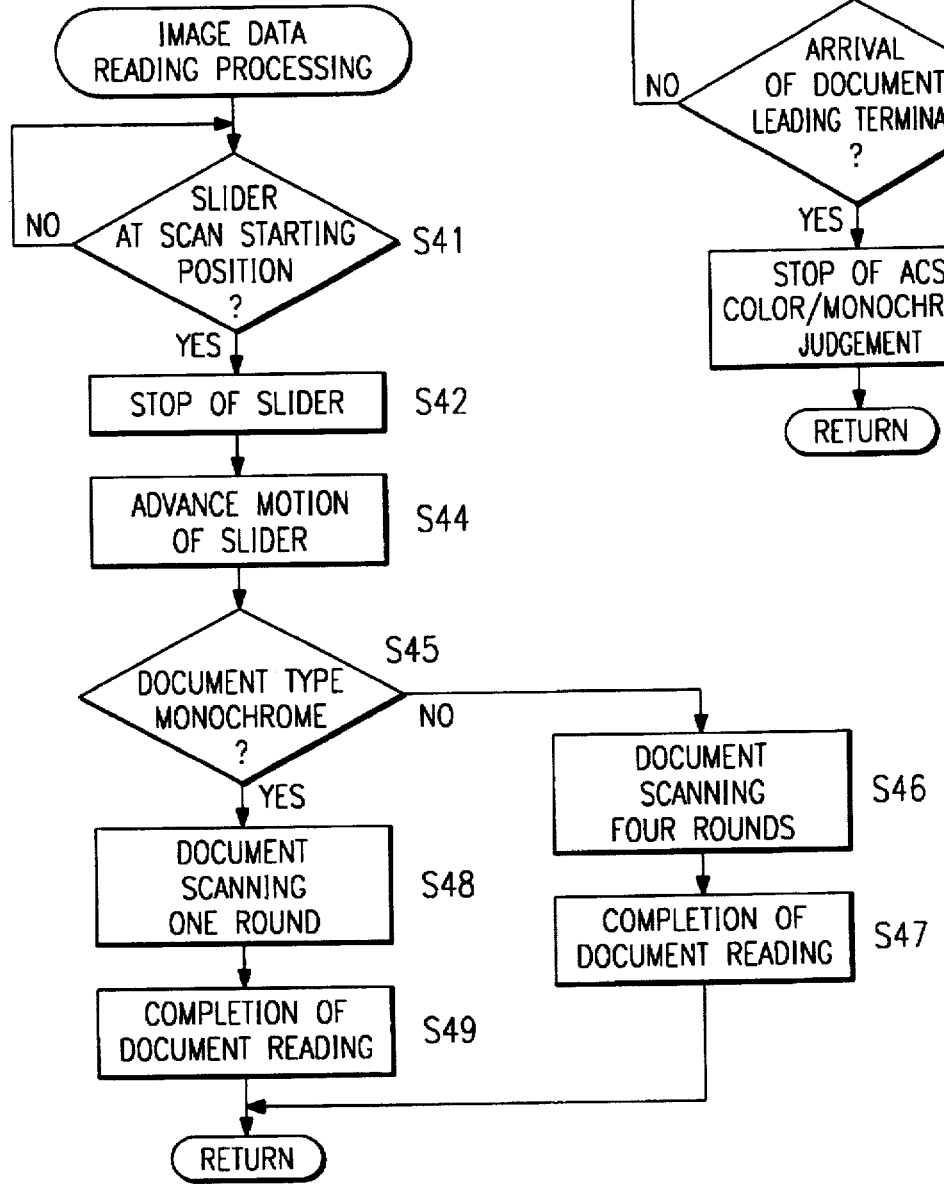
FIG. 13 is a flow chart of the routine for processing the image data of FIG. 10.

A flow of the image data reading processing (S4) is shown in FIG. 13. First, when the scan starting position sensor SE21 detects the first slider 211 going into the scan starting position P3, the first slider 211 makes a pause at the scan starting position P3 (S41, S42). Subsequently, when the CPU 225 judges that the preparation of the scanning is completed, the first slider 211 reverses the direction of travel and begins to advance from the scan starting position P3 toward the waiting position P2 (S44), and the reading of the document image starts. On the part of the reading, the processing corresponding to the color original document or the monochrome original document, in response to the outcome of judgment of ACS processing (S3), is done (S45).

In case of the color original document, as conceptually shown in FIG. 15, the first slider 211 advances from the scan starting position P3 and after the arrival at the standard reading position P1, the reading operation of the first value of color of the image data of the original document starts (S46). Before the first slider 211 reaches the standard reading position P1, the slider is accelerated to be at a constant speed. The reading terminal position P4 is where the reading of the area corresponding to the document size is terminated while the first slider 211 continues the advance motion. After a stop, the first slider 211 reverses and returns from the reading terminal position P4. After returning to the scan starting position P3, the first slider 211 comes to a stop and reverses again, and advances from the scan starting position P3 to the standard reading position P1 and after the arrival of the standard reading position P1, the reading operation of the second value of color of the image data of the original document starts. Furthermore, reading operations of the third value of color and the fourth value of color of the image data of the original document are executed in due order in the same manner mentioned above (S46). When the reading operation of the fourth value of color of the image data of the original document are ended (S47), the present flow of the program returns to the step S5 as shown in FIG. 10 and the first slider 211 comes to a stop at the reading terminal position P4 where the reading operation of the fourth value of color of the image data of the original document is terminated. The reading terminal position P4 is located below the document stand 29 and away from the movable scale 120. While working together with the reading operation mentioned above, the reproduction of the color image is done on the recording paper 27 in the printer unit 202.

If the setting number of the copying operation is one, the number of the residual copies changes into zero (S6), and it is, by reason of the manual setting of the original document, judged that the next document is not in existence (S8), and in consequence the first slider 211 advances from the reading terminal position P4 to the waiting position P2 and comes to a stop at the waiting position P2 and the operation of the image scanner unit 201 is ended (S9).

If the setting number of the copying operation is more than one, in the step S6 the judgment "NO" is made. Subsequently, as indicated by a broken line in FIG. 15, the first slider 211 starts the return motion from the reading terminal position P4 (S7) for repeating the image data reading processing (S4) mentioned above. Namely, the first slider 211 backs to the scan starting position P3 (S41), and then starts to advance after making a pause (S42, S44), and begins again the reading operation of the first value of color of the image data for the formation of the image out of the second sheet of the documents (S45, S46). After this, the first slider 211 repeats the same operation as in case of the first sheet of the documents mentioned above.

On the other hand, in case of the monochrome original document, as conceptually shown in FIG. 16, the first slider 211 advances from the scan starting position P3 and after the arrival at the standard reading position P1, the reading operation of the image data of the original document is executed one time (S48). After the document reading (S49), the present flow of the program returns to step S5 as shown in FIG. 10 and the first slider 211 comes to a stop at the reading terminal position P4. While working together with the reading operation mentioned above, the reproduction of the monochrome image is done with the black toners on the recording paper 27 in the printer unit 202.

If the setting number of the copying operation is one, the number of the residual copies changes into zero (S6), the first slider 211 advances from the reading terminal position P4 to the waiting position P2 and comes to a stop at the waiting position P2 and the operation of the image scanner unit 201 is ended (S9) as well as in case of the color original document.

If the setting number of the copying operation is more than one, in the step S6 the judgment "NO" is made. Subsequently, as indicated by a broken line in FIG. 16, the first slider 211 starts the return motion from the reading terminal position P4 (S7) for repeating the image data reading processing (S4) mentioned above. Namely, the first slider 211 backs to the scan starting position P3 (S41), and then starts to advance after making a pause (S42, S44), and begins again the reading operation of the image data for the formation of the image out of the second sheet of the documents (S45, S48). After this, the first slider 211 repeats the same operation as in case of the first sheet of the documents mentioned above the number of times in response to the setting number for copying.

Operation in serial pages copying mode

Figure 17:
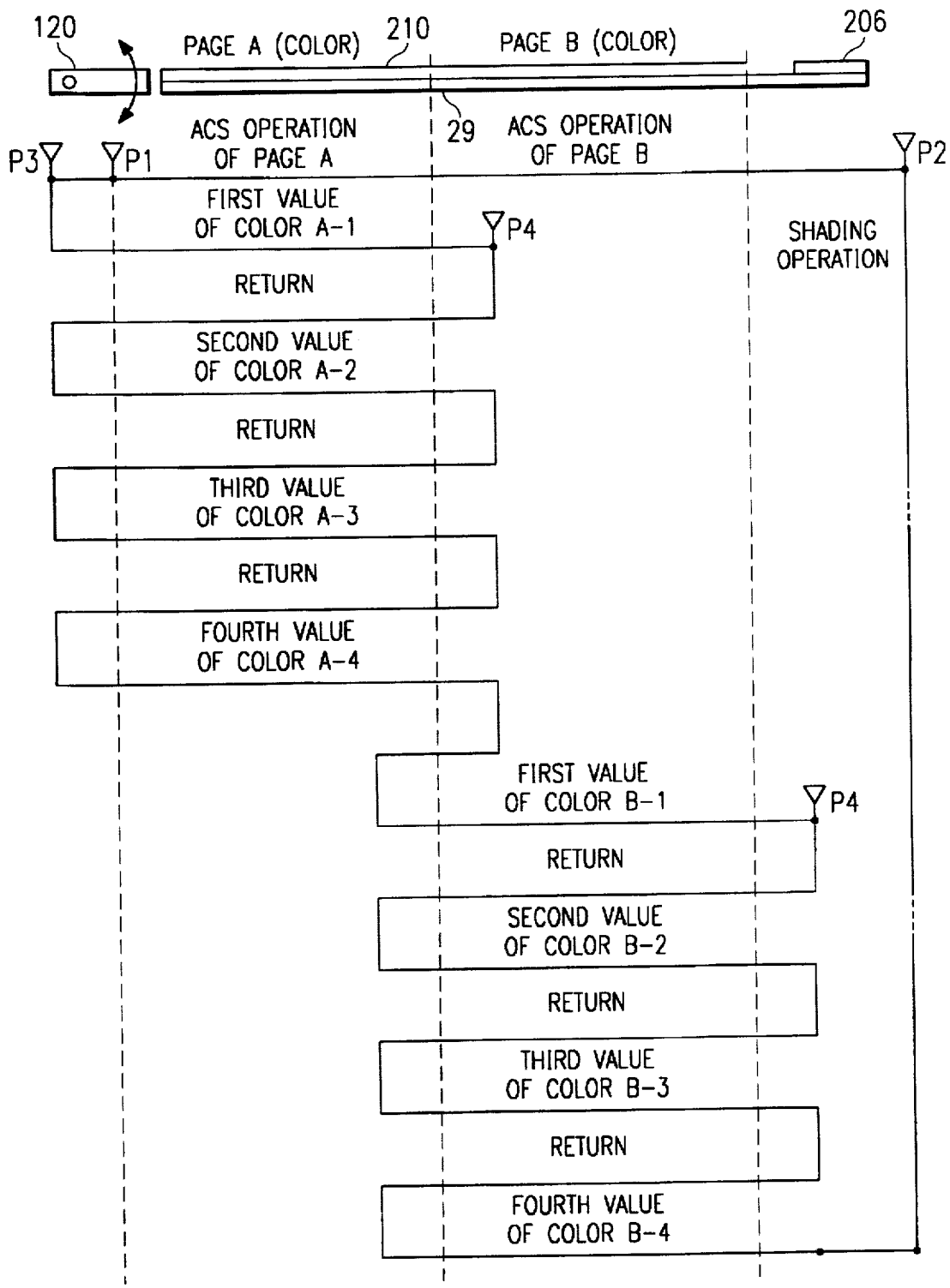
FIG. 17 is an explanatory diagram depicting the artist'concept of the operation of the first slider during the process of copying serial pages of a book comprising color documents on both alternating pages.
Figure 18:
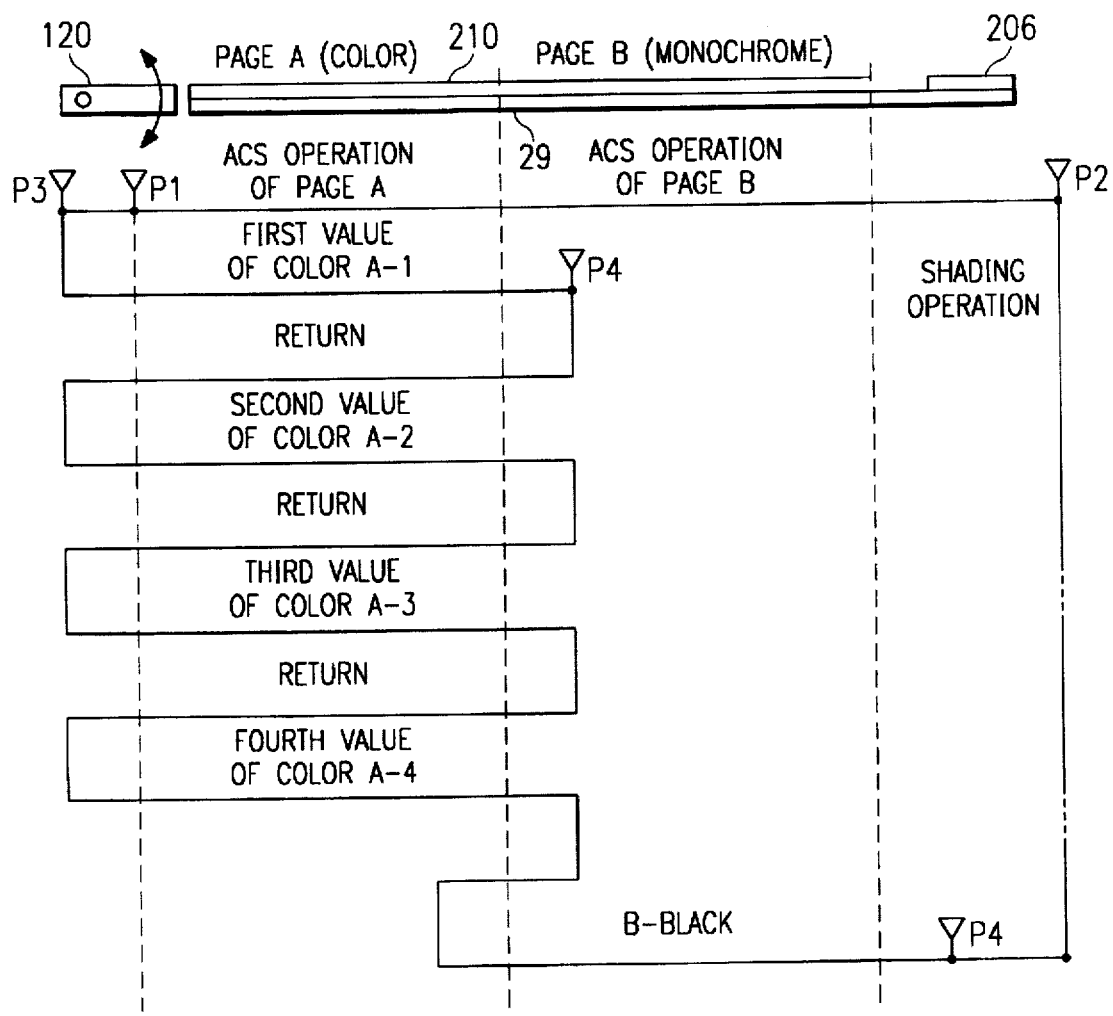
FIG. 18 is an explanatory diagram depicting the artist'concept of the operation of the first slider during the process of copying serial pages of a book comprising color documents on one page and a monochrome document on another page.

Next, an operation of the image scanner until will be explained in reference to FIGS. 17 and 18 under the condition that the so-called serial pages copying mode is selected for reproducing image data of the right and left pages of a book, etc. on the recording papers respectively. FIG. 17 is an explanatory diagram depicting the artist's concept of the operation of the first slider during the process of copying serial pages of a book comprising color documents on both alternating pages, and FIG. 18 is an explanatory diagram depicting the artist's concept of the operation of the first slider during the process of copying serial pages of a book comprising a color document on one page and a monochrome document on another page. Besides, page A and page B in the description refer to the left page and the right page respectively for convenience's sake.

The plurality of document size sensors SE20 detect the size of the original document 210 disposed along the scales 120 and 205. When the document size is found to be, for example, size A3, an area occupied by the document 210 is divided into two parts which are size A4 prior to the ACS operation.

If color documents are recorded on pages A and B respectively, from the ACS operation during the return motion after the shading correction, it is judged as shown in FIG. 17 that the color documents are recorded on pages B and A respectively. And the following reading operations are executed on the basis of the outcome of the judgment.

If the setting number of the copying operation is one, first concerning page A, the reading operation of the image data is repeated four times which corresponding to the first value of color A-1 to the fourth value of color A-4 respectively. After the reading operation of the image data corresponding to the fourth value of color A-4, concerning page B, the reading operation of the image data is repeated four times which corresponding to the first value of color B-2 to the fourth value of color B-4 respectively. After the reading operation of the image data corresponding to the fourth value of color B-4, the first slider 211 advances from the reading terminal position P4 to waiting position P2 and comes to a stop at the waiting position P2 and the operation of the image scanner unit 201 is terminated.

If the setting number of the copying operation is more than one, concerning page A, after the reading operation of the image data corresponding to the fourth value of color A-4, the same reading operations are repeated from the reading operation of the image data corresponding to the first value of color A-1, and concerning page B, after the reading operation of the image data corresponding to the fourth value of color B-4, the same reading operations are repeated from the reading operation of the image data corresponding to the first value of color B-1. When the number of times of the reading operation concerning page B coincides with the setting number of the copying operation, the first slider 211 advances from the reading terminal position P4 to waiting position P2 and comes to a stop at the waiting position P2 and the operation of the image scanner unit 201 is terminated.

If a color and a monochrome documents are recorded on pages A and B respectively, from the ACS operation during the return motion after the shading correction, it is judged as shown in FIG. 18 that the monochrome document and the color document are recorded on pages B and A respectively. And the following reading operations are executed on the basis of the outcome of the judgment.

If the setting number of the copying operation is one, first concerning page A, the reading operation of the image data is repeated four times which corresponding to the first value of color A-1 to the fourth value of color A-4 respectively. After the reading operation of the image data corresponding to the fourth value of color A-4, concerning page B, the reading operation of the image data for making a black monochrome copy is done only one time. After the reading operation of the image data corresponding to the page B, the first slider 211 advances from the reading terminal position P4 to waiting position P2 and comes to a stop at the waiting position P2 and the operation of the image scanner unit 201 is terminated.

If the setting number of the copying operation is more than one, concerning page A, after the reading operation of the image data corresponding to the fourth value of color A-4, the same reading operations are repeated from the reading operation of the image data corresponding to the first value of color A-1, and concerning page B, after the reading operation of the image data for making a black monochrome copy, the same reading operations are repeated. When the number of times of the reading operation concerning page B coincides with the setting number of the copying operation, the first slider 211 advances from the reading terminal position P4 to waiting position P2 and comes to a stop at the waiting position P2 and the operation of the image scanner unit 201 is terminated.

As stated above, under the serial pages copying mode, from the outcomes of the ACS operation during the return motion of the sliders 211 and 212, the color/monochrome judgments are executed on the respective pages A and B as the divided parts. On the basis of the judgment, the following reading operations of the image data are done and a prescribed reproduction of the document image is done in the printer unit 202.

Meanwhile, under the so-called serial pages double copying mode for reproducing image data of the right and left pages of a book, etc. on the obverse face and reverse face of recording papers respectively, if color documents are recorded on pages A and B respectively, from the reading operation as shown in FIG. 17, reproductions with the four values of color are done on both of the obverse/reverse faces, and if a color and a monochrome documents are recorded on pages A and B respectively, from the reading operation as shown in FIG. 18, the reproduction with the four values of color is done on the obverse face and the reproduction of the monochrome image is only done on the reverse face.

Operation of document handling with ADF
(1) Case of one-to-one coping

An original document set in the ADF 60 is conveyed on the document stand 29 by the operation of the ADF 60 and collided with the scale 120 and thereby, stopped at the standard reading position P1. During the above process, the sensors SE2 and SE10 detect the size of the original document 210. Optionally, the sensors SE2 and SE10 may be set to detect the size of the original document 210 after the stop of the document at the standard reading position P1 by force. An operation of the first slider 211 in case of copying the original document which is automatically set on the document stand 29 by the operation of the ADF 60 is the same as the operation of the first slider 211 in case of copying the original document which is manually set on the document stand 29 (description concerning the steps S1–S4 as shown in FIG. 10) and therefore, an explanation for the operation of the first slider 211 is omitted. When the number of times of the copying operation coincides with the setting number involved in a prescribed original document, the first slider 211 is at rest (S5), and the number of the residual copies changes into zero (S6), and it is judged whether or not the next document is in existence, namely, it is judged on the basis of the signal outputted from the sensor SE1 whether or not a necessary original document for reading exists in the ADF 60 (S8).

When the next document stands in readiness, after the document discharge sensor SE24 detects, in the step S10, the passage of the rear terminal 210a of an original document 210 of which the reading operation has been completed, the first slider 211 starts to return from the reading terminal position P4 toward the scan starting position P3 (S7), and the preset flow returns to the step S4 for the image data reading processing (S4).

This series of the operations are repeated until no original document is set in the ADF 60 (S4-S5-S6-S8-S10-S7-S4). After the completion of the reading operation of all documents, the first slider 211 advances from the reading terminal position P4 to the waiting position P2 and comes to a stop at the waiting position P2 and the operation of the image scanner unit 201 is ended (S9).

(2) Case of two-in-one mode Coping

The document inlet of the ADF 60 according to the embodiment is disposed on the opposite side to the standard reading position P1 of the main body of the copying device shown in FIG. 20A. Therefore, even if given original documents are not reversed upside down at the document setting on the ADF 60, the order in which the two original documents are set in place on the document stand 29 is the same as that of the serial page numbers of the documents FIG. 20B), and consequently, an order of page numbers of the produced copies is likewise correct (FIG. 20C).

In addition, the shading correction plate 206 is disposed on the opposite side to the standard reading position P1 in reference to the document stand 29 and thereby, the missing part does not occur in the area for reading the original document and this arrangement is regarded as an appropriate construction from the viewpoint of miniaturizing a copying device. Furthermore, the shading correction plate 206 is disposed on the document stand 29 and exists at the same altitude as the original document exists. Consequently, the reading of the shading correction plate 206 can be done in the same condition as the reading of the image data of the original document and thereby, the shading correction can be done with accuracy.

On the other hand, regarding such a copying device 1 with the scale 120 according to the embodiment, there are some cases where powders made of paper are formed by rubbing of the original documents during the discharge with the edges of the leading end side of scale 120, and dust, etc. on the document stand 29 is gathered together toward the leading end part of the original document with the conveyance of original documents. As a result, at the discharge of the original documents with the ADF 60, the paper powders, the dust and the like drop through the clearance between the document stand 29 and the scale 120 formed by the downward retraction of the scale 120, into the internal parts of the image scanner unit 201 according to circumstances. When the scale 120 is designed to be movable, the falling of the paper powders, etc. can not be removed perfectly because the design produces some amount of the clearance.

Figure 22A:
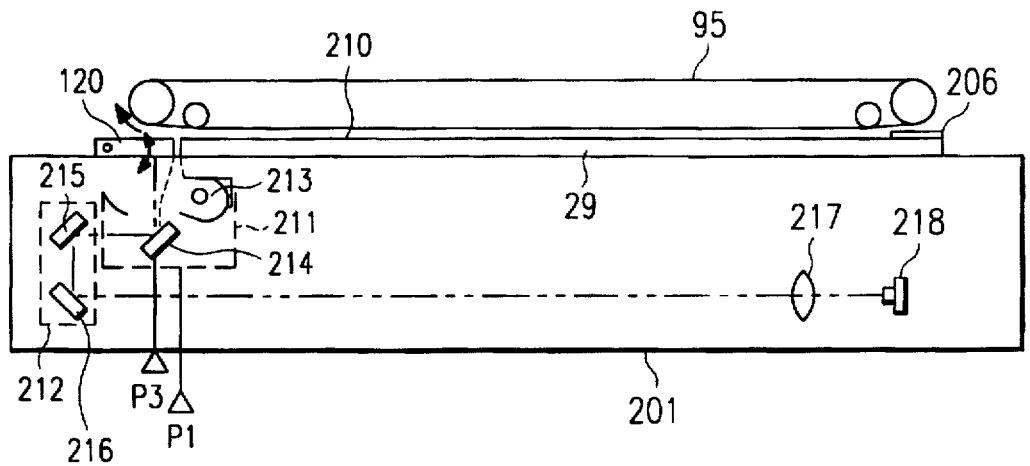
FIG. 22A, FIG. 22B, and FIG. 22C are diagrams to aid in describing the operation of a slider.

In consequence, it is understood as to a copying device 1 provided with the movable scale 120, that an mode for repeating the operation of copying on condition that a plurality of original documents are set in the ADF 60 produces the following problems. Namely, when a program for returning the scale 120 to the scan starting position P3 before the scale 120 is retracted downwardly and the discharge of an original document is terminated is adopted, as shown in FIG. 22A, the slider 211 is covered with the paper powders and the like falling through the clearance between the document stand 29 and the scale 120. If the paper powders and the like adhere to the mirror 214 of the slider 211, the paper powders and the like block off the optical path. Consequently, noises of the printed image occurs, resulting in a drop of the quality of the printed image.

Figure 22B:
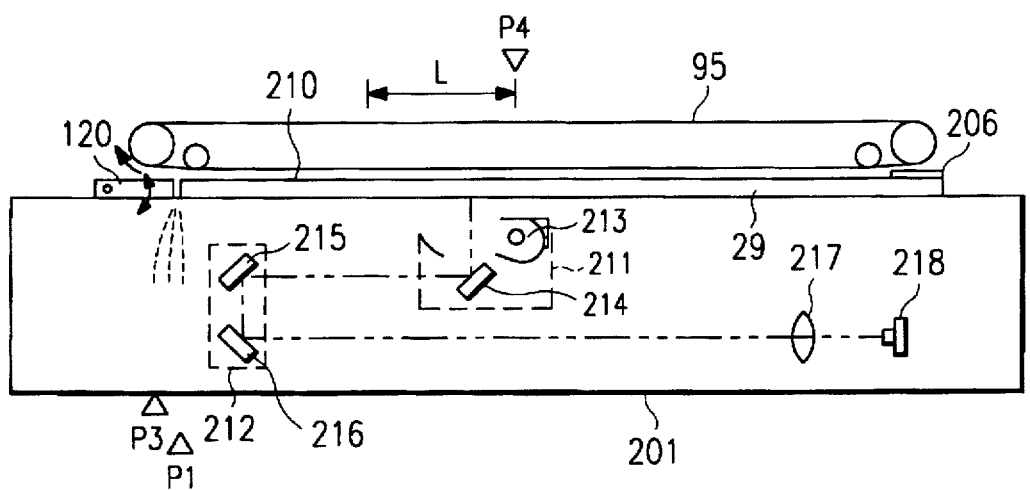

In view of the points mentioned above, it is preferable that a program for saving the scale 120 from being located under the clearance between the document stand 29 and the scale 120 during the document discharge, and returning the scale 120 to the scan starting position P3 after the completion of the document discharge is adopted as shown in FIG. 22B, in order to prevent the paper powders and the like from lowering the quality of the printed image produced.

For that reason, in the copying device 1 of the embodiment described above, when the original document is found (S8), after the document discharge sensor SE24 detects the passage of the rear terminal 210a of the original document 210 which has undergone the image data reading processing (S10), the first slider 211 which has continued to stop at the reading terminal position P4 (S5) is returned to the scan starting position P3 (S7). According to the copying device 1 of the embodiment, the slider 211, therefore, is not covered with the paper powders and so forth. During the document discharge and as a result, the paper powders and so forth do not lead to the noises of the printed image and the drop of the quality of the printed image produced.

Figure 14:
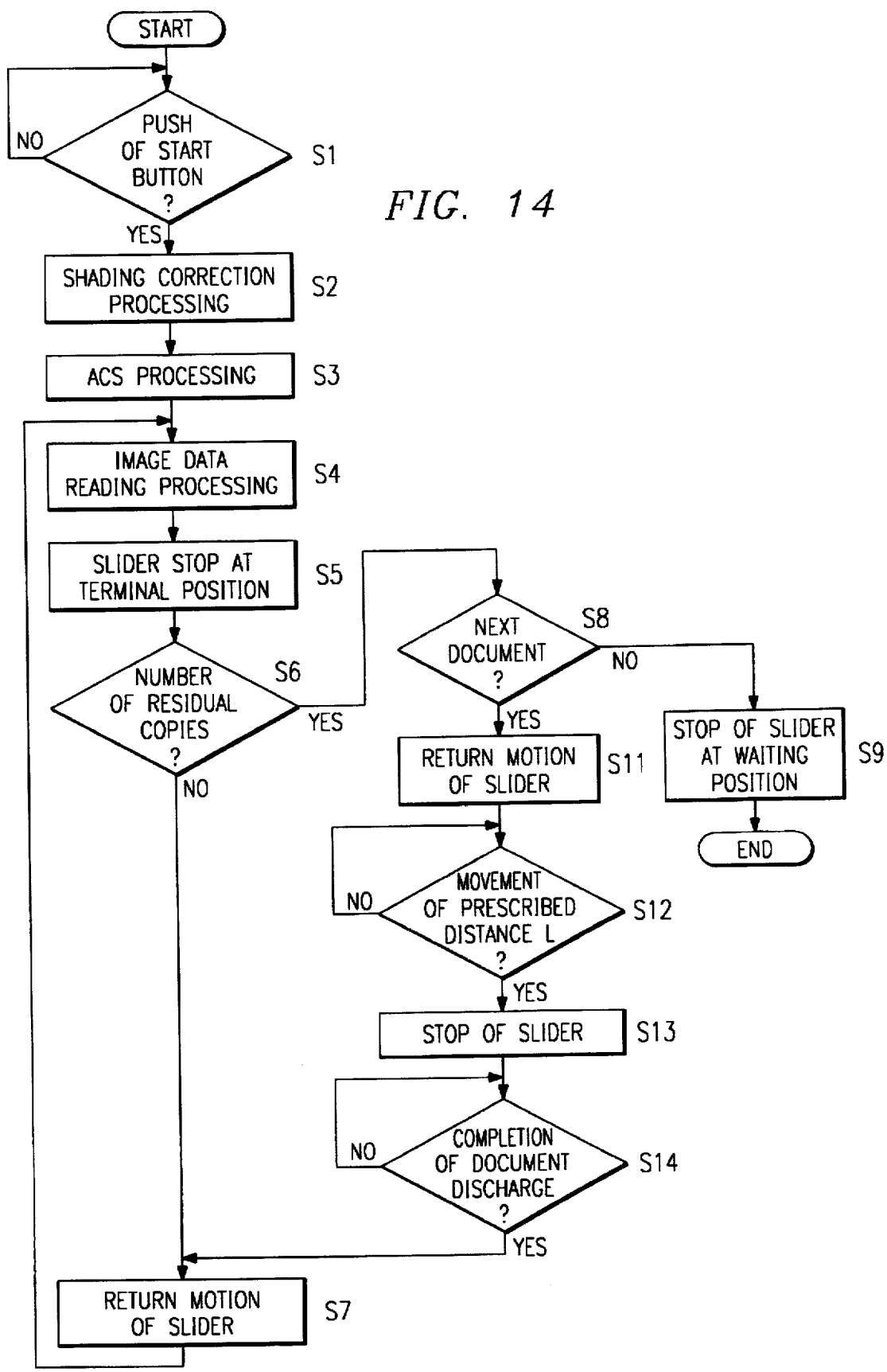
FIG. 14 is a main flow chart showing the operation of the image scanner unit in the second example of this invention.

FIG. 14 is a main flow chart showing the operation of the image scanner unit in the second example of this invention. In the case of the second example, the prevention of the lowering of the quality of the printed image is designed also. However, processing in relation to the motion of the sliders 211, 212 on condition that the next document is in existence is different from the processing (S10) in relation to the motion of the sliders 211, 212 according to the first example. Accordingly, the same processing as the first example has refers to the same step numbers in FIG. 10 as the first example has, respectively and an explanation in relation to the steps is omitted.

When the original document is found (S8), the first slider 211 which has continued to stop at the reading terminal position P4 (S5) starts the return motion to the scan starting position P3 (S11). When the length of the movement of the first slider 211 reaches a prescribed length L (FIG. 21B) in reference to the reading terminal position P4 (S12), the first slider 211 comes to a stop (S13). Thereby, the first slider 211 is brought near the scan starting position P3 while being the prescribed length L away from the reading terminal position P4 and, therefore, the second slider 212 is stopped at a position which is the length L/2 away from the reading terminal position P4. Subsequently, after the document discharge sensor SE24 detects the passage of the rear terminal 210a of the original document 210 which has undergone the image data reading processing (S14), the first slider 211 is returned toward the scan starting position P3 (S7) as well as in the first example. The prescribed length L is set as a length wherein the first slider 211 is not disposed under the clearance between the document stand 29 and the scale 120 as well as the second slider 212 even if the first slider 211 is brought near the scan starting position P3 while being the length away from the reading terminal position P4 corresponding to the document size.

In the second example wherein the sliders 211 and 212 are actuated in the above-mentioned manner, the sliders are not covered with the paper powders and so forth during the document discharge and as a result, the paper powders and so forth do not lead to the noises of the printed image and the drop of the quality of the printed image produced. Furthermore, in the second example, the sliders 211 and 212 are already brought near the scan starting position P3 from the reading terminal position P4 before the completion of the document discharge. It is, therefore, capable of quickly returning the first slider 211 to the scan starting position P3 when the next image data of an original document is read. Namely, the following operation of the image data reading can be executed rapidly.

Figure 22C:
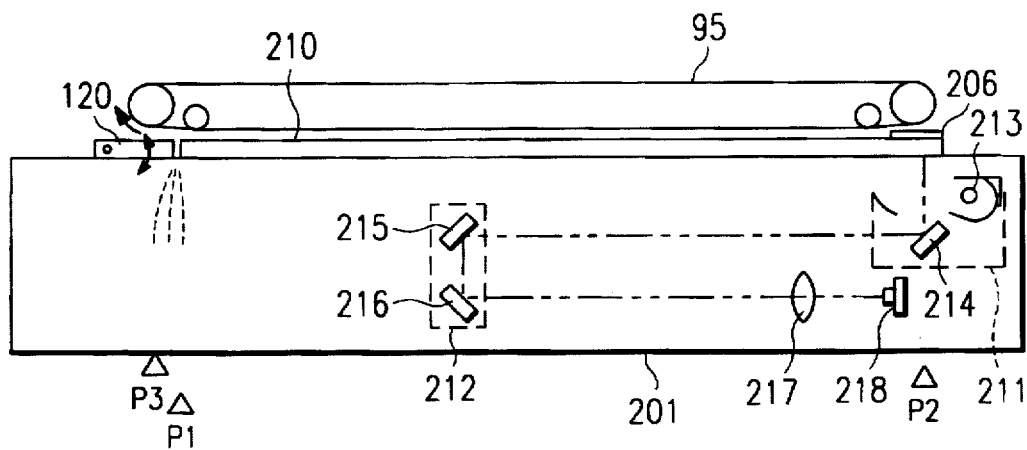

When the reading operation of the shading correction plate 206 is repeated in response to respective sheets of original document under the pressure of various necessities, it is preferable to adopt a program as shown in FIG. 22C for provisionally moving the slider 211 to the waiting position P2 located on the opposite side to the standard reading position P1 after the completion of the image data reading processing, and returning the slider 211 to the scan starting position P3 after the completion of the document discharge.

The above points aims at shortening the time of the first copy. It goes without saying that time requirement for inputting the signal for starting to copy, and executing the shading correction processing and the ACS processing, and returning the slider 211 to the scan starting position P3 is shorter than time requirement for moving the transfer paper to the starting point for the formation of an image.

As aforesaid, the explanatory for the embodiments as the color copying devices to which the color image processing apparatuses are applied is made. But the invention is not limited in this case. It need scarcely be said that the invention may be applied to a color image scanner and a color image scanner provided with the ACS unit which is used, connected to a computer and the like.

What is claimed is:

1. An image processing apparatus comprising:

an image reader for reading an image with a photoelectric conversion device;

a slider mechanism adapted to scan image data of an original document which is placed on a document stand and to form an image on the photoelectric conversion device, said slider mechanism being provided with a waiting position on an opposite side from a position for starting a scan relative to the document stand;

a shading correction plate interposed between the document stand and the waiting position of the slider mechanism;

a shading corrector for correcting an output of the photoelectric conversion device on the basis of data resulting from reading the shading correction plate;

a document distinct processor for discerning the kind of original document on the document stand;

a pre-process controller for returning the slider mechanism from the waiting position to the position for starting a scan and for actuating the shading corrector and the document distinct processor while the return is still in process; and an image read controller for advancing the slider mechanism from the position for starting a scan to the waiting position and for effecting an operation of reading the image of the original document on the basis of the outcome of the discrimination attained by the document distinct processor.

2. An image processing apparatus according to claim 1, wherein the document distinct processor discriminates a given original document between a color original document and a monochrome original document.

3. An image processing apparatus according to claim 1, further comprising a document size detector for detecting the size of the original document placed on the document stand.

4. An image processing apparatus according to claim 1, further comprising:

an automatic document feeder for automatically feeding the original document onto the document stand and for automatically discharging the original document after the reading of the original document is completed; and a positioning member disposed in a terminal part of the document stand on an opposite side from a terminal part in which the shading correction plate is disposed, said positioning member being adapted to position the original document fed by the automatic document feeder and which causes the discharge of the original document by the automatic document feeder to be effected from the side on which the positioning member is disposed.

5. An image processing apparatus according to claim 4, wherein the positioning member is retractably constructed so as to avoid interfering with the discharge of the original document.

6. An image processing apparatus according to claim 1, wherein:

the document stand is made of glass; and the shading correction plate is disposed on a top of the document stand.

7. An image processing apparatus comprising:

an image reader for reading an image with a photoelectric conversion device;

a slider mechanism adapted to scan image data of an original document which is placed on a document stand made of glass and to form an image on the photoelectric conversion device, said slider mechanism being provided with a waiting position on an opposite side from a position for starting a scan relative to the document stand;

a shading correction plate;

a shading corrector for correcting an output of the photoelectric conversion device on the basis of data resulting from reading the shading correction plate;

a document distinct processor for discerning the kind of original document on the document stand; and a controller for effecting an operation of the shading corrector and the document distinct processor in case of a first movement wherein the slider mechanism moves in a direction from the waiting position, and for effecting an operation of the image reader in case of a second movement wherein the slider mechanism moves in an direction differing from the direction of the first movement.

8. An image processing apparatus according to claim 7, further comprising a document size detector for detecting the size of the original document placed on the document stand.

9. An image processing apparatus according to claim 7, wherein the image reader performs an operation of reading the image of the original document on the basis of the outcome of the discrimination attained by the document distinct processor.

10. An image processing apparatus according to claim 7, wherein the document distinct processor discriminates a given original document between a color original document and a monochrome original document.

11. An image processing apparatus according to claim 7, wherein the shading correction plate is interposed between a document loading area of the document stand and the waiting position of the slider mechanism.

12. An image processing apparatus according to claim 11, wherein the shading correction plate is disposed on the document stand.

13. An image processing apparatus according to claim 7, further comprising:

an automatic document feeder for automatically feeding the original document onto the document stand and for automatically discharging the original document after the reading of the original document is completed; and a positioning member disposed in a terminal part of the document stand on an opposite side from a terminal part in which the shading correction plate is disposed, said positioning member being adapted to position the original document fed by the automatic document feeder and which causes the discharge of the original document by the automatic document feeder to be effected from the side on which the positioning member is disposed.

14. An image processing apparatus according to claim 13, wherein the positioning member is retractably constructed so as to avoid interfering with the discharge of the original document.

15. An image processing apparatus according to claim 7, wherein the first movement is performed at a speed which is greater than a speed of the second movement.

* * * * *